United States Patent [19]
Freund et al.

[11] Patent Number: 5,893,912
[45] Date of Patent: Apr. 13, 1999

[54] THREAD CONTEXT MANAGER FOR RELATIONAL DATABASES, METHOD AND COMPUTER PROGRAM PRODUCT FOR IMPLEMENTING THREAD CONTEXT MANAGEMENT FOR RELATIONAL DATABASES

[76] Inventors: Thomas James Freund, Hants, United Kingdom; Robert Howard High, Jr., Round Rock, Tex.; Gordon Douglas Hutchison; Martin Mulholland, both of Chandlers Ford, United Kingdom; Charlie James Redlin; Peter John Schommer, both of Rochester, Minn.; Kathryn Sarah Warr, Winchester, United Kingdom

[21] Appl. No.: 08/910,656

[22] Filed: Aug. 13, 1997

[51] Int. Cl.⁶ ............................................. G06F 17/30
[52] U.S. Cl. ........................... 707/103; 707/1; 707/2; 707/6; 707/7; 707/8; 707/10; 707/100; 707/101; 395/676; 395/677; 395/671; 84/604
[58] Field of Search ............................ 707/1, 2, 6, 7, 707/8, 10, 100, 101, 103; 395/677, 676, 671; 84/604

[56] References Cited

U.S. PATENT DOCUMENTS 5,519,867  5/1996  Moeller ............................ 395/677
5,680,619  10/1997 Gudmundson ....................... 395/701
5,692,193  11/1997 Jagannathan ....................... 395/676

*Primary Examiner*—Thomas G. Black
*Assistant Examiner*—Diane D. Mizrahi

[57] ABSTRACT

In brief, an object oriented thread context manager, a method and computer program product are provided for object oriented thread context management, particularly for relational databases working with distributed transactions. A context manager is provided for managing a plurality of ContextControl objects. Each ContextControl object comprises a plurality of methods for creating, resuming and suspending context on a thread for a target object. A ContextCoordinator class is provided for managing calls to the plurality of ContextControl objects. A ContextHandleList is provided for storing context information for the ContextControl objects. A specialized ContextCoordinator is provided for managing calls to a specialized ones of the ContextControl objects. A DatabaseContextCoordinator is an example of the specialized ContextCoordinator. The specialized ones of the ContextControl objects are registered and unregistered with the ContextCoordinator class and then registered DatabaseContextCoordinator.

16 Claims, 29 Drawing Sheets

CREATION SEQUENCE:
NO TRANSACTION MIGRATION - ONE TRANSACTION ACTIVE AT A TIME
NO TRANSACTION MIGRATION - MULTIPLE TRANSACTIONS
XA ASSOCIATION MIGRATION

CLASS DIAGRAM OF CONTEXT MANAGER 132

| REGISTRATION INTERFACE METHODS FOR CONTEXTCONTROL OBJECTS, TRANSACTIONS CONTEXT CONTROL, XADB2 CONTEXTCONTROL, DB2 CONTEXTCONTROL BY CONTEXT COORDINATOR 204 | |
|---|---|
| REGISTER CONTEXTCONTROL(CONTEXTCONTROLNAME, ABCCONTEXTCONTROLPTR) 230 | |
| CONTEXTCONTROLID REGISTER CONTEXTCONTROLFORID (CONTEXTCONTROLNAME, ABCCONTEXTCONTROLPTR) 232 | |
| ABCCONTEXTCONTROL PTR UNREGISTERCONTEXTCONTROL (CONTEXTCONTROLNAME) 234 | |

FIG. 2B

CREATION SEQUENCE:
MANUAL TRANSACTION MIGRATION

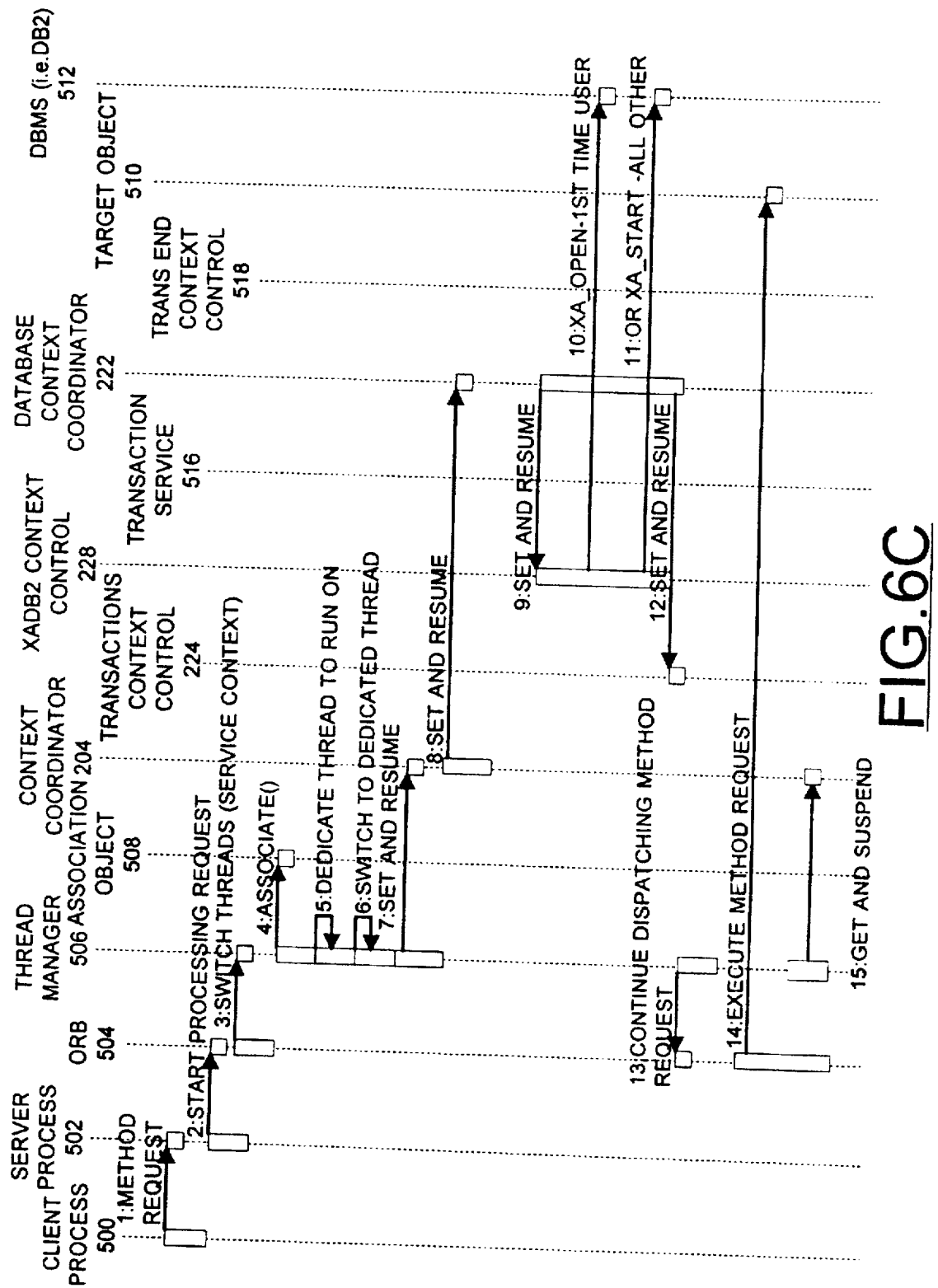

EXECUTION SEQUENCE:
MANUAL MIGRATION

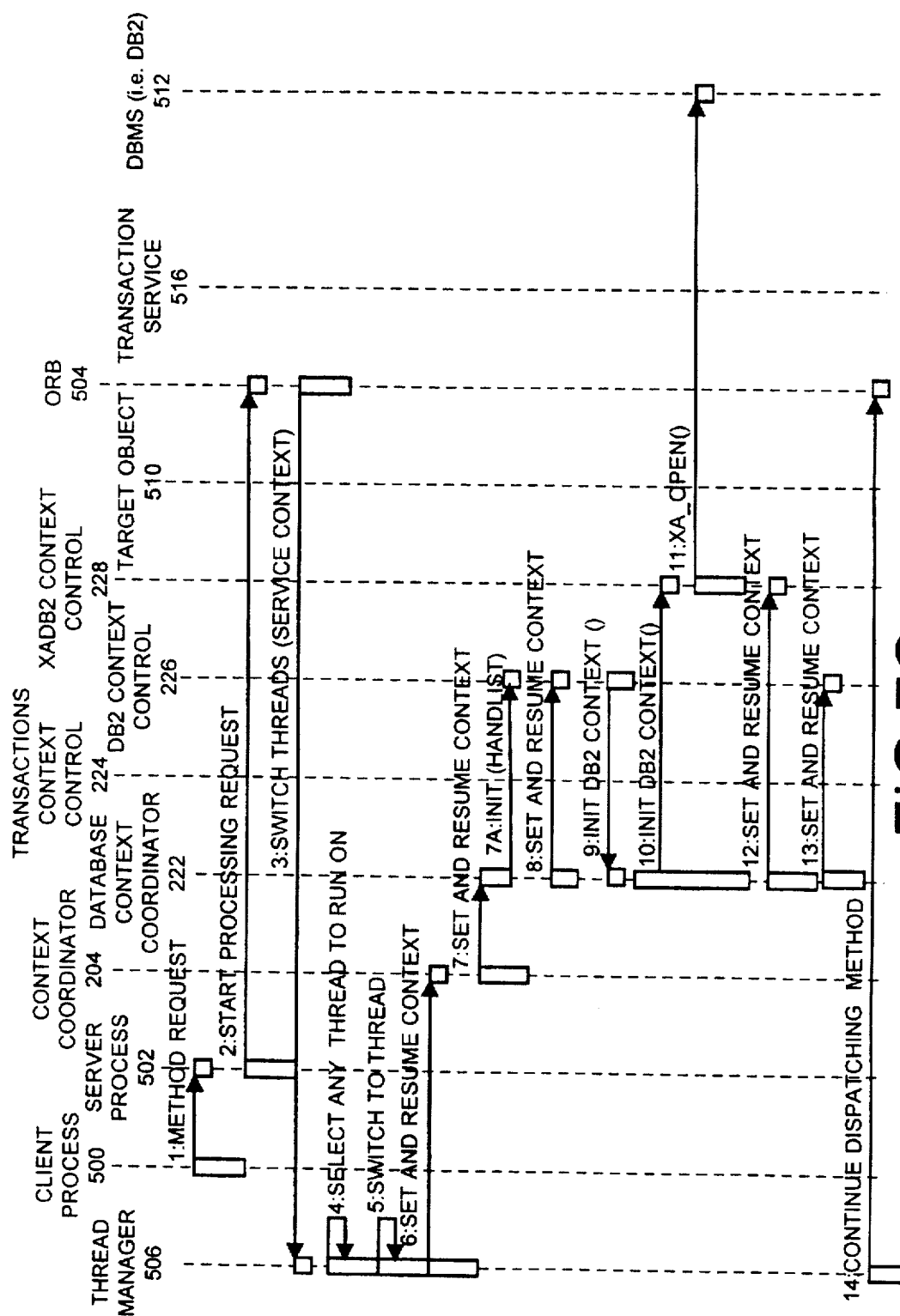

EXECUTION SEQUENCE:
XA ASSOCIATION MIGRATION

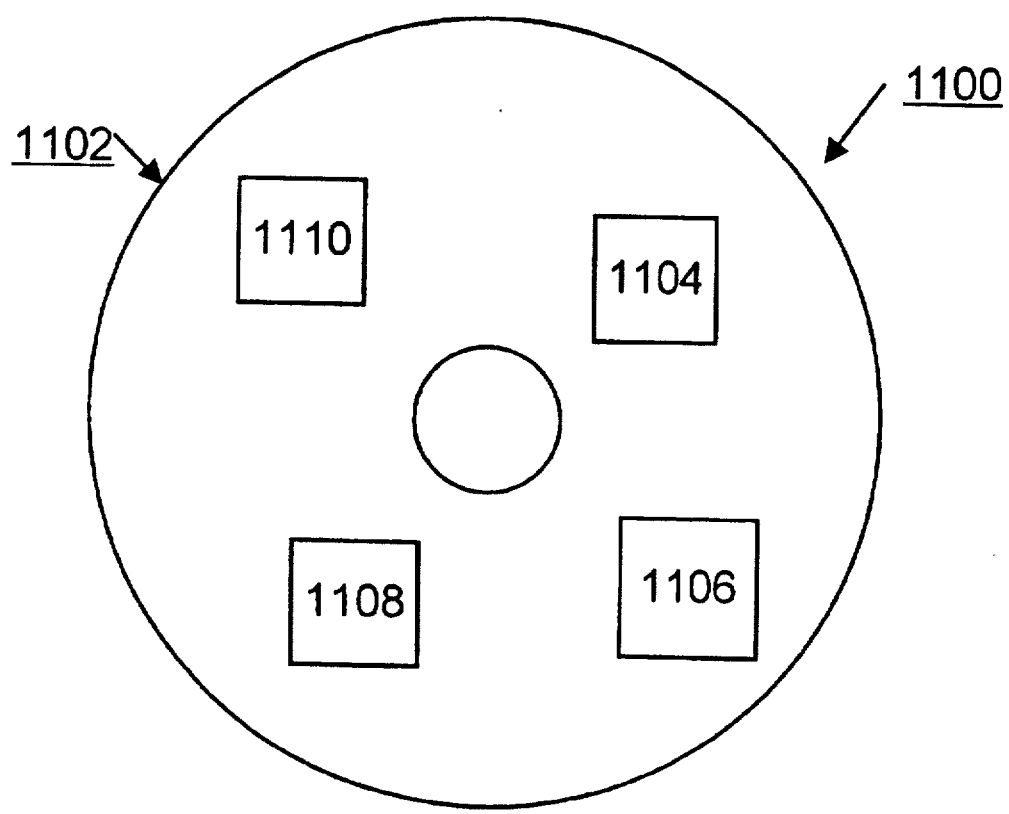

THREAD CONTEXT MANAGER FOR RELATIONAL DATABASES, METHOD AND COMPUTER PROGRAM PRODUCT FOR IMPLEMENTING THREAD CONTEXT MANAGEMENT FOR RELATIONAL DATABASES

FIELD OF THE INVENTION

The present invention relates to the data processing field, and more particularly, relates to an object oriented thread context manager for relational databases, method and computer program product for implementing thread context management for relational databases.

DESCRIPTION OF THE PRIOR ART

As used in the description, the following terms are defined as:

Context generally represents information about the client, environment, or service. Default context means a minimal or vanilla context on a thread required by some services to process any request. Context is that information which a service needs to coordinate successive calls to the service.

An object is an entity that may contain or receive data, and that may be assigned a name which may be used to reference the object. An object may include a plurality of processes or methods.

Service is an execution environment entity which provides a resource to an executing method request. A target object means an object on the server which is the target of the incoming method request.

A thread is the element that is scheduled, and to which resources such as execution time, locks and queues may be assigned in a computer operating system environment. An execution thread is a thread in which a method request is dispatched on a target object.

Relational and other database management systems (DBMSs) vary in their ability to work with transactions in a multi-threaded server environment. Various ways of working with threads and transactions are used among Database Management systems (DBMSs).

First, a DBMS may require that the work done as part of a transaction always be executed on the same thread, and only one transaction may be active on a thread at a time. In this case, a transaction cannot move from one thread to another. Second, a DBMS may require that the work done as part of a transaction always be executed on the same thread, but multiple transactions may be active on a thread at a time. In this case, a transaction cannot move from one thread to another. Third, a DBMS may allow transactions to be moved from one thread to another and provide an application program interface (API) to manually do this. Fourth, a DBMS may allow transactions to be moved from one thread to another and handle the move automatically by supporting XA association migration. The XA interface is described in "Distributed Transactions Processing: The XA Specification", by XOPEN Company Ltd., United Kingdom, 1991. XA association migration is an optional part of the XA specification that allows the TMMIGRATE keyword to be used in combination with TMSUSPEND on the xa_en() function call. These keywords tell the DBMS that the transaction is being suspended on this thread, and when execution of the transaction continues, it may not be on the same thread.

A mechanism is needed to encapsulate these differences and ensure that transactions will work correctly for a particular DBMS's threading context model.

SUMMARY OF THE INVENTION

A principal object of the present invention is to provide an object oriented thread context manager for relational databases, method and computer program product for object oriented thread context management for relational databases. Other important objects of the present invention are to provide such object oriented thread context manager, method and computer program product substantially without negative effect and that overcome many of the disadvantages of prior art arrangements.

In brief, an object oriented thread context manager, a method and computer program product are provided for object oriented thread context management, particularly for relational databases. A context manager is provided for managing a plurality of ContextControl objects. Each ContextControl object comprises a plurality of methods for creating and suspending context on a thread for a target object. A ContextCoordinator class is provided for managing calls to the plurality of ContextControl objects. A ContextHandleList is provided for storing context information for the ContextControl objects. A specialized ContextCoordinator class is provided for managing calls to specialized ones of the ContextControl objects.

A DatabaseContextCoordinator is an example of a specialized ContextCoordinator class. The specialized ones of the ContextControl objects are registered and unregistered with the ContextCoordinator class and then registered DatabaseContextCoordinator.

BRIEF DESCRIPTION OF THE DRAWING

The present invention together with the above and other objects and advantages may best be understood from the following detailed description of the preferred embodiments of the invention illustrated in the drawings, wherein:

FIG. 2B is a block diagram representation illustrating methods for registering and unregistering the ContextControl objects and specialized ContextCoordinators in accordance with the preferred embodiment;

FIGS. 6A, 6B, 6C, and 6D together provide a flow chart illustrating exemplary sequential calls when a request to execute a method on an object is received by a server process with no transaction migration with multiple transactions per thread in accordance with the preferred embodiment;

FIGS. 7A, 7B, 7C, and 7D together provide a flow chart illustrating exemplary sequential calls when a request to execute a method on an object is received by a server process with manual transaction migration in accordance with the preferred embodiment;

FIG. 11 is a block diagram illustrating a computer program product in accordance with the preferred embodiment.

DETAILED DESCRIPTION OF THE PREFERRED EMBODIMENTS

Figure 1A:
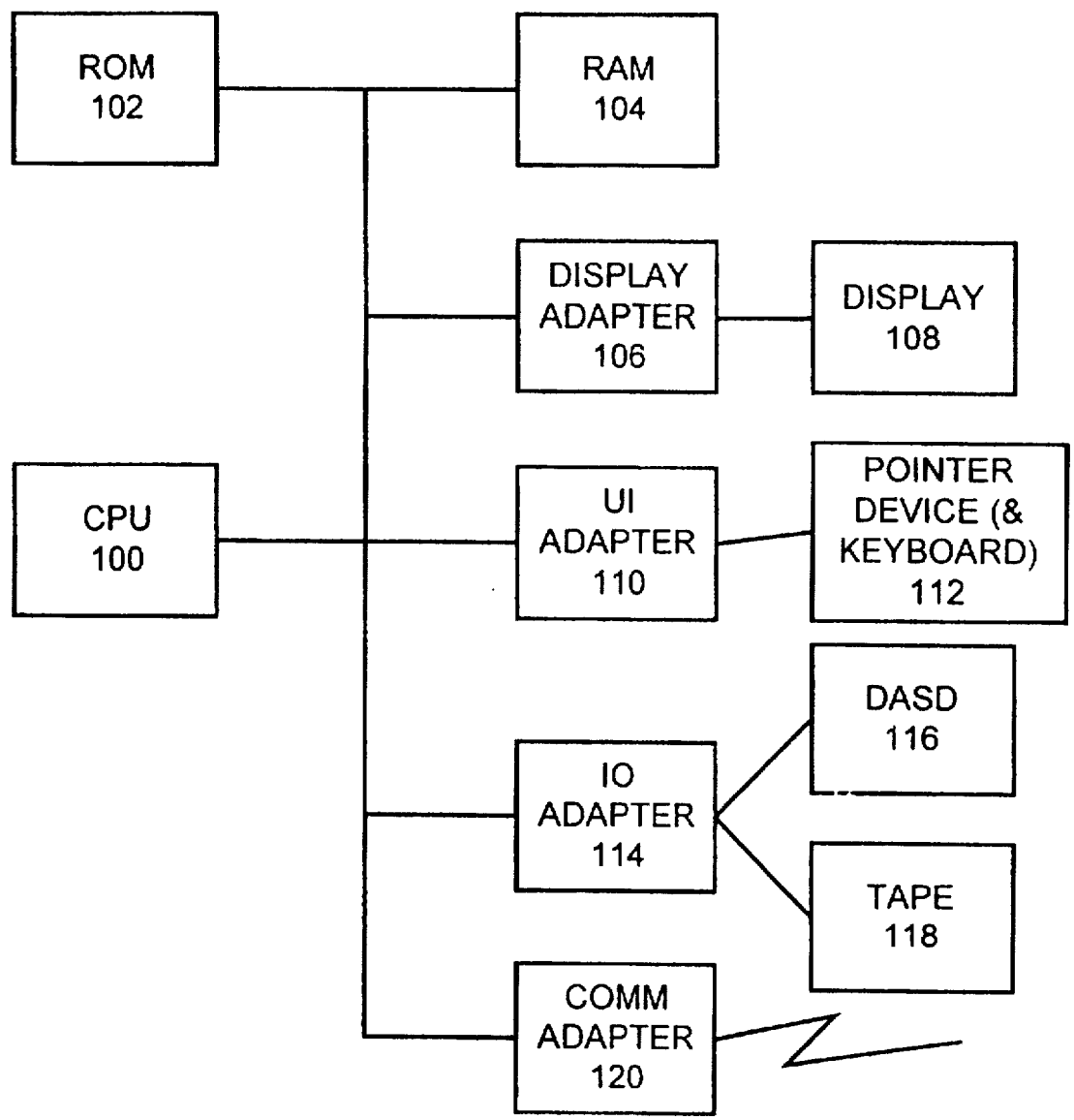
FIGS. 1A and 1B are block diagram representations illustrating a computer system and operating system for implementing a method for object oriented thread context management for relational databases in accordance with the preferred embodiment.
Figure 1B:
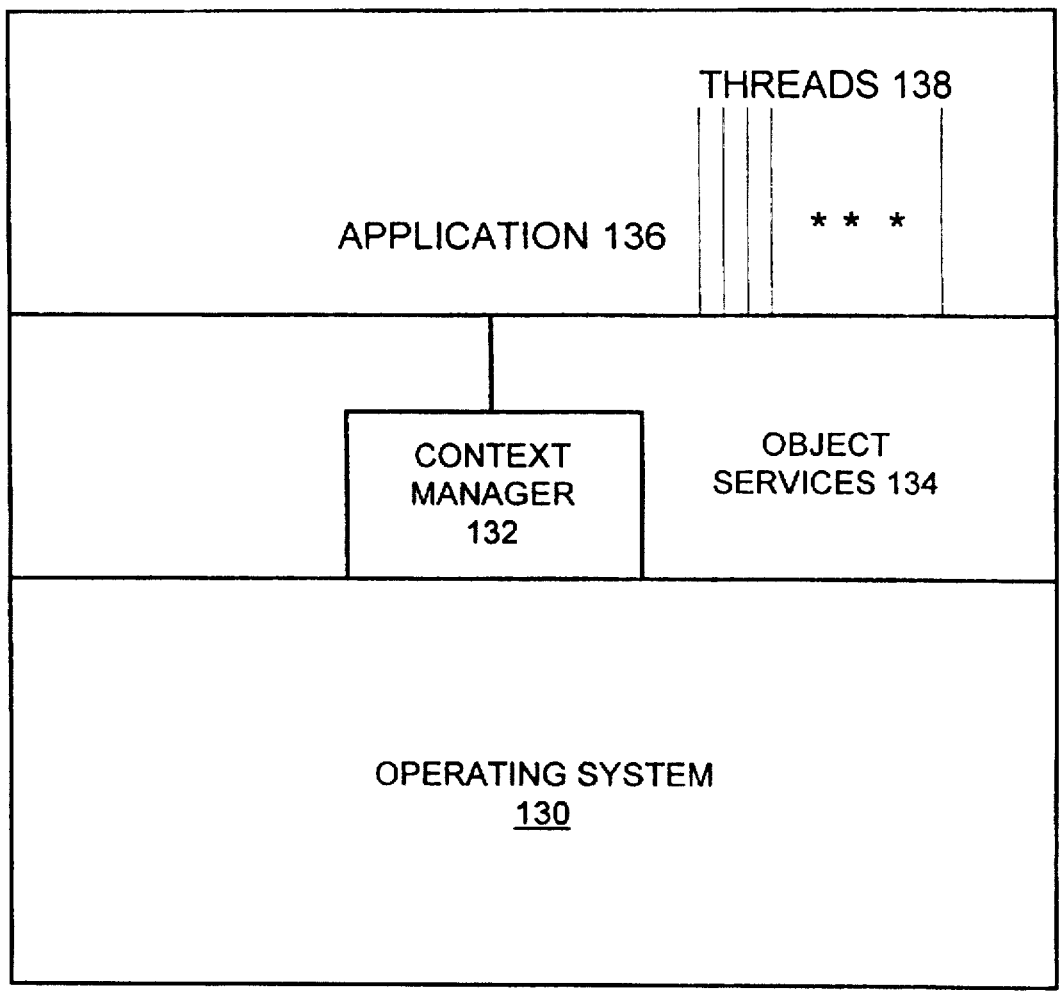

Having reference now to the drawings, in FIGS. 1A and 1B, there is shown a computer or data processing system of the preferred embodiment generally designated by the reference character 100. As shown in FIG. 1A, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

As shown in FIG. 1B, computer system 100 includes an operating system 130 and a middleware operating layer including a context manager 132 and multiple object services 134 of the preferred embodiments. An application 136 and a plurality of threads 138 are supported by the operating system 130 including the context manager 132 and multiple object services 134. In accordance with the preferred embodiment, prior to a method request being executed on an object service 134, context on the thread 138 is set up utilizing context manager 132. After the method finishes executing, the context on the thread may be cleaned up utilizing the context manager 132. Various commercially available processors could be used for computer system 100, for example, an IBM personal computer, similar workstation or mainframe computer can be used. Central processor unit 101 is suitably programmed to execute the flowcharts of FIGS. 3A, 3B, 4A, 4B, 5A, 5B, 6A, 6B, 7A, 7B, 8A, 8B, 9A, 9B, 10A, and 10B of the preferred embodiment.

Partial binding means putting no more context information on a thread 138 than can be moved from one thread to another. To put onto a thread 138 means making the context information accessible to services executing on a given thread 138, in the format familiar to the service, such as an object service 134. To take off of a thread means removing the context information from a given thread 138. Resume is the process of associating/reassociating a context with the current execution thread. Suspend is the process of disassociating a context from the current execution thread.

Figure 1C:
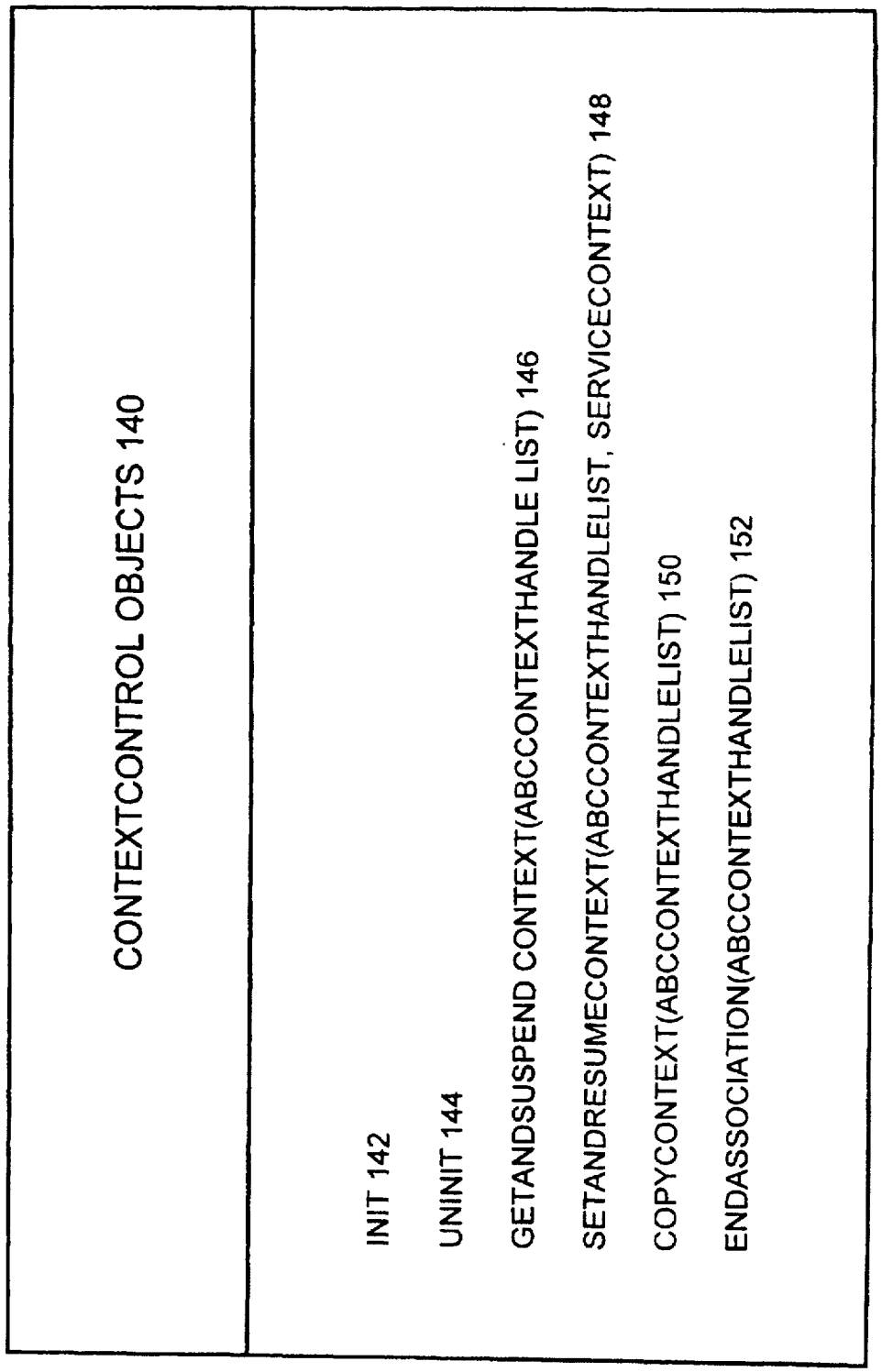
FIG. 1C is a block diagram representation illustrating methods comprising a ContextControl object in accordance with the preferred embodiment.

As illustrated in FIG. 1C, the ContextControl Objects 140 includes six methods shown in all capital letters in FIG. 1C, while a mixed case naming convention is used where for method names composed of more than one word, the first letter of words after the first word are capitalized, as follows:

1. ini() 142;
2. uninit 144;
3. getAndSuspendContext(ABCContextHandleList) 146;
4. setAndResumeContext(ABCContextHandleList, ServiceContext) 148;
5. copyContext(ABCContextHandleList) 150; and
6. end Association(ABCContextHandleList) 152.

Figure 2A:
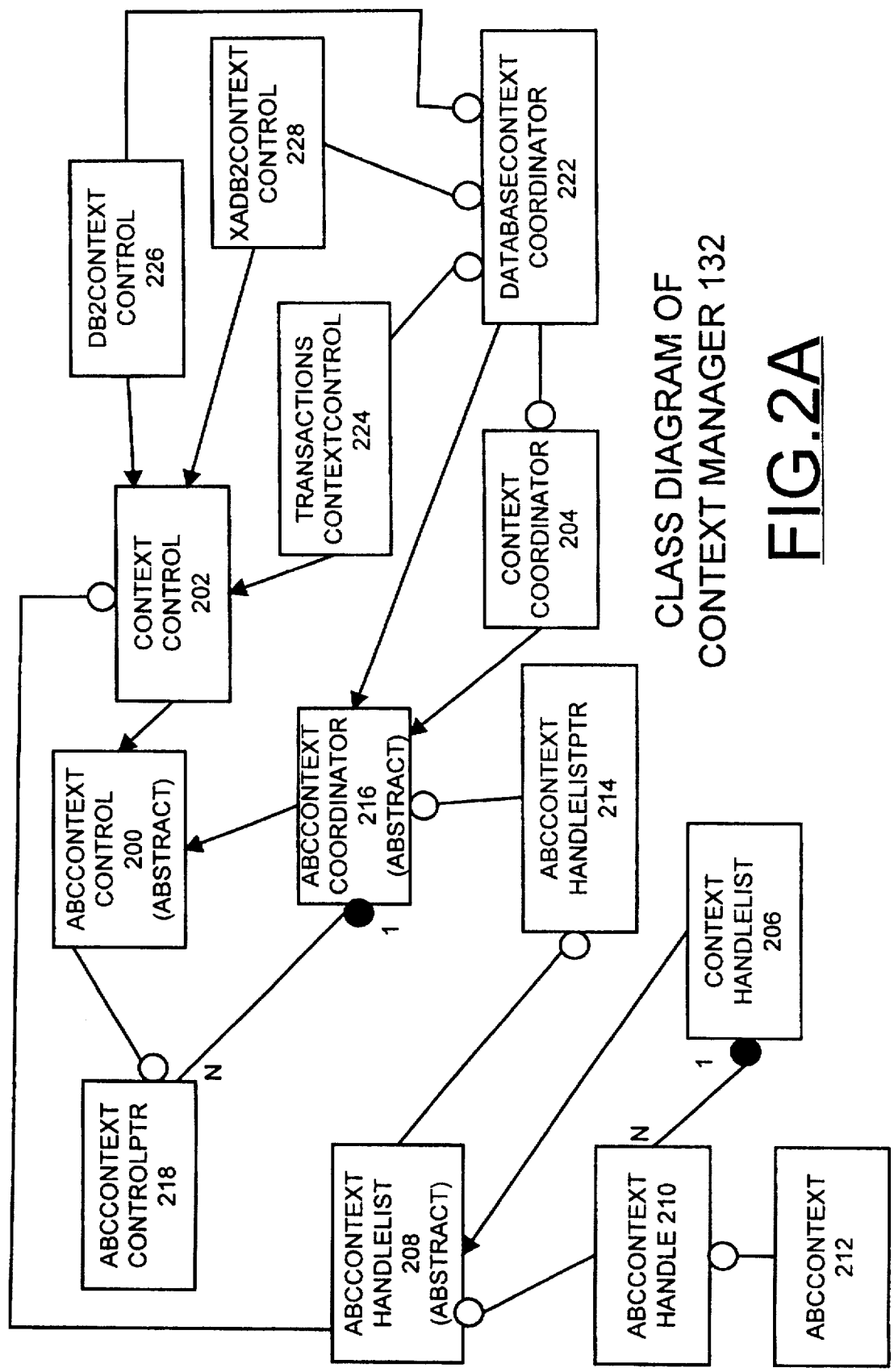
FIG. 2A is a block or class diagram illustrating an object oriented context manager for relational databases in accordance with the preferred embodiment.

Referring now to FIG. 2A, there is shown the architecture of context manager 132. In FIG. 2A; inheritance is represented by pointers or lines between classes including arrows, where the arrow points to the class from which another class inherits. In FIG. 2A, open connectors on lines between classes represent that the class adjacent the open connector uses or references the other class, and solid or filled connectors indicate that the referenced class is created and the storage is managed by the proximate class to the solid connector. An object cannot be created from an abstract class. The purpose of an abstract class is to provide a base of inheritance for derived classes. Since the names of classes would vary depending on the DBMS being accessed, DB2 is used as an example.

Context manager 132 includes an ABCContextControl 200, an ContextControl 202, a ContextCoordinator 204, and a ContextHandleList 206. The ABCContextControl 200 is an abstract base class (ABC) interface. ContextControl 202 is a base class for ContextControl objects which provides a default implementation for the ABCContextControl 200. ContextCoordinator 204 is a main coordinator class for coordinating calls to ContextControl objects. ContextHandleList 206 is a list whereby a ContextControl object 140 puts its context into or takes it out of when requested. The ContextHandleList 206 inherits from an abstract base class ABCContextHandleList 208. The ContextHandleList 206 contains from 1 to N objects of an abstract base class ABCContextHandle 210. The ABCContextHandleList 208 uses the ABCContextHandle 210. The ABCContextHandleList 210 references an abstract base class ABCContext 212. An abstract base class ABCContextHandleListPtr 214 references the ABCContextHandleList 208. Context manager 132 includes an abstract base class ABCContextCoordinator 216. ContextCoordinator 204 inherits from an abstract base class ABCContextCoordinator 216 and provides an implementation of its interface. ABCContextCoordinator 216 contains from 1 to N objects of an abstract base class ABCContextControlPtr 218 and uses the ABCContextHandleListPtr 214. ContextCoordinator 204 also manages a Database ContextCoordinator 222. Database ContextCoordinator 222 inherits from ABCContextCoordinator 216 and provides an implementation of its interface. Database ContextCoordinator 222 manages a Transactions ContextControl 224, a DB2ContextControl 226, and an XADB2ContextControl 228.

In accordance with features of the preferred embodiment, context manager 132 may include a plurality of specialized ContextCoordinator including the DatabaseContextCoordinator 222, as shown in FIG. 2A. Exemplary specialized ContextControl object classes include the TransactionsContextControl 224, the DB2ContextControl 226, and the XADB2ContextControl 228, as shown. The TransactionsContextControl 224, the DB2ContextControl 226, and the XADB2ContextControl 228 initially are registered with the top level ContextCoordinator 204. With the construction of the DatabaseContextCoordinator 222, the TransactionsContextControl 224, the DB2ContextControl 226 and the XADB2ContextControl 228 will be unregistered from the top level ContextCoordinator 204 and registered with the DatabaseContextCoordinator 222. The DatabaseContextCoordinator 222 coordinates calls to the specialized ContextControl Objects, Transactions ContextControl 224, DB2ContextControl 226 and XADB2ContextControl 228.

The ABCContextControl 200 is used by the ContextCoordinator 204 so that the ContextCoordinator 204 can forward all of the method calls onto the ContextControl objects 140 it manages. ABCContextControl 200 provides the interface for the methods that are used to manage contexts on threads 138 including getAndSuspendContext (ABCContextHandleList) 146, setAndResumeContext (ABCContextHandleList, ServiceContext) 148, copyContext(ABCContextHandleList) 150, endAssociation (ABCContextHandleList) 152, ini() 142, and uninit() 144. The main ContextCoordinator 204 manages its ContextControl objects 140 along with each specialized ContextCoordinator 222. Each object service 134 may have a different way of dealing with its context. Object service 134 creates its own ContextControl object 140 which it registers with the ContextCoordinator 204. Within each ContextControl object 140 resides logic to handle its context in a way which is appropriate to the object service 134 it supports.

ContextControl 202 provides a base class for other ContextControl objects. ContextControl 202 implements empty methods so that if code which subclasses off of it chooses not to override all methods, the methods can still be safely called. ContextControl objects 140 registered with the main ContextCoordinator 204 will be deleted by the ContextCoordinator 204 when the server is terminating. If a ContextControl object 140 needs to clean up resources, it needs an implementation of a destructor or the uninit method 144. ContextHandleList 206 is used to pass contexts between threads 138. The ContextHandleList 206 is simply a list which maps a ContextControlID to a ContextHandle. ContextHandleList 206 is used as a vehicle to move context onto and off of threads 138.

DatabaseContextCoordinator 222 implements the methods in the ABCContextControl interface 200 by passing the method call along to each ContextControl that it coordinates. It also implements methods to register and unregister ContextControls. All of the ContextControls, for example, Transactions ContextControl 224, DB2ContextControl 226 and XADB2ContextControl 228 that this class coordinates are for manipulating transaction and database contexts. In addition, DatabaseContextCoordinator 222 coordinates additional methods which are not part of ABCContextControl 200 in these ContextControls. This class must ensure that the calls to the ContextControls are made in the proper order.

Transactions ContextControl 224 implements the methods in the ContextControl interface 202. Transactions ContextControl 224 calls APIs which start, suspend, resume, and end transactions on a database and is registered with the DatabaseContextCoordinator 222 at server startup time.

DB2ContextControl 226 implements the methods in the ContextControl interface 202. DB2ContextControl 226 associates and disassociates database contexts on a thread 138 and is registered with the DatabaseContextCoordinator 222 at server startup time.

XADB2ContextControl 228 implements the methods in the ContextControl interface 202. XADB2ContextControl 228 manages connections.

Referring to FIG. 2B, the ContextCoordinator 204 supports methods for registering and unregistering the ContextControl Objects 140. ContextCoordinator 204 together with DatabaseContextCoordinator 222 supports methods for registering and unregistering Transactions ContextControl 224, the DB2 ContextControl 226 and the XADB2ContextControl 228. The use of the registration process is two fold. First, the registration process lets the ContextCoordinator 204 store a reference to the ContextControl object 140 which it will need to call later. Second, the registration process provides a mechanism for the ContextCoordinator 204 to provide a key, a ContextControlID by which the ContextHandleList 206 can be searched.

The signatures for the methods for registering and unregistering the ContextControl Objects 140 are as follows:

registerContextControl(ContextControlName, ABCContextControlPtr) 230;

ContextControlId registerContextControlForID (ContextControlName, ABCContextControlPtr) 232; and ABCContextControlPtr unregisterContextControl (ContextControlName) 234;

where ContextControlName is the name (string) of the ContextControl object 140 which is registering; ABCContextControlPtr 218 is a reference to the ContextControl object 140; and ContextControlID is a unique identifier generated by the ContextCoordinator 204 with the registerContextControlForID method 232. The ContextCoordinator 204 maintains the mapping between the ContextControlName and the ContextControlID. The ContextControlID is saved by the ContextControl object 140 and used for accessing the ContextHandleList 206. The registerContextControl (ContextControlName, ABCContextControlPtr) method 230 is used to register those ContextControl objects 140 which never have need to provide a context and thus have no need for an ID to index the ContextHandleList 206. The unregisterContextControl (ContextControlName) 234 is used to unregister a ContextControl object 140 for the given ContextControlName.

Figure 4A:
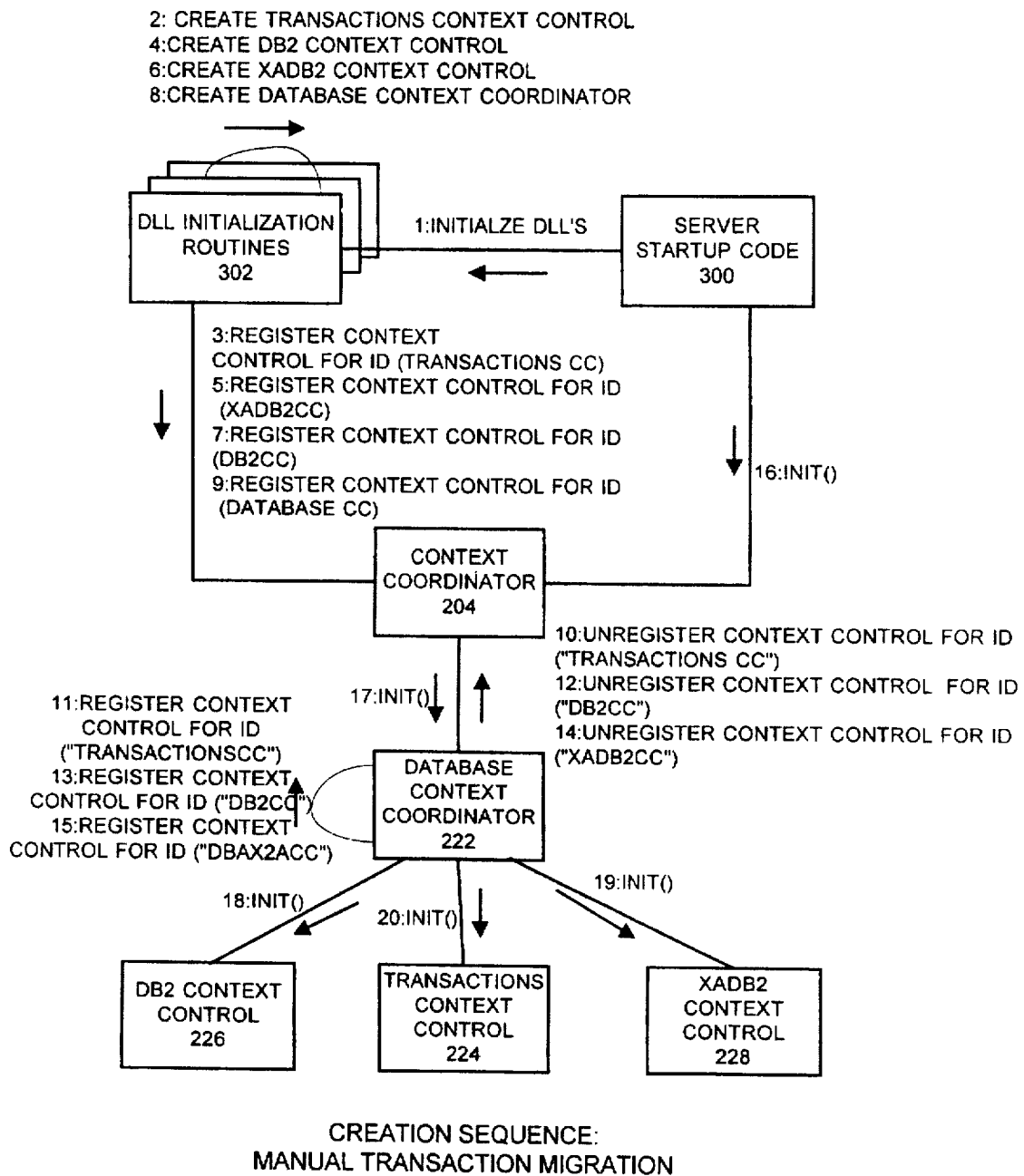
FIGS. 4A and 4B together provide a flow chart illustrating exemplary sequential calls for creation of another specialized ContextCoordinator for DBMSs for which manual transaction migration in accordance with the preferred embodiment.
Figure 4B:
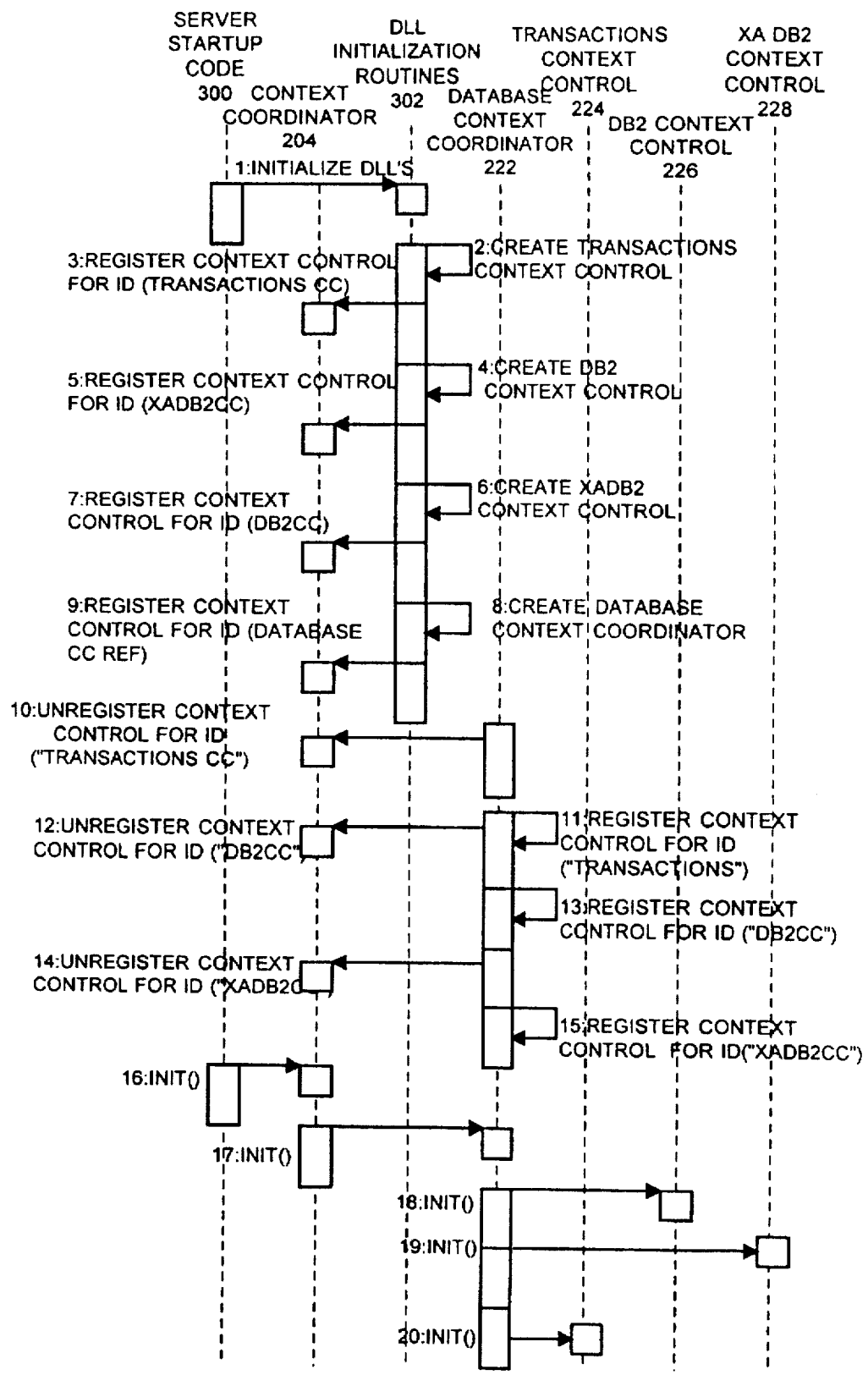
Figure 5A:
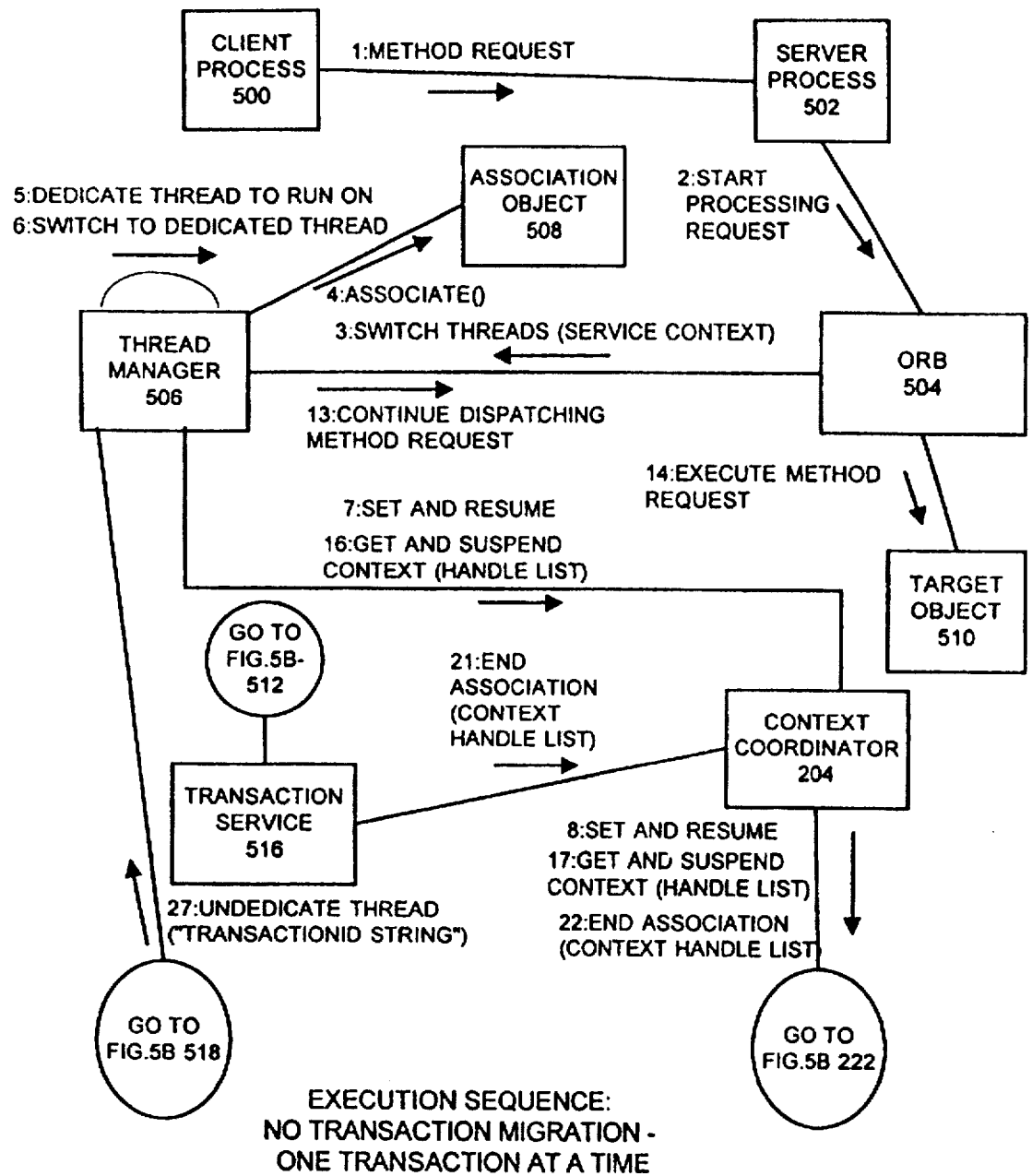
FIGS. 5A, 5B, 5C, and 5D together provide a flow chart illustrating exemplary sequential calls when a request to execute a method on an object is received by a server process with no transaction migration with one transaction at a time in accordance with the preferred embodiment.
Figure 5B:
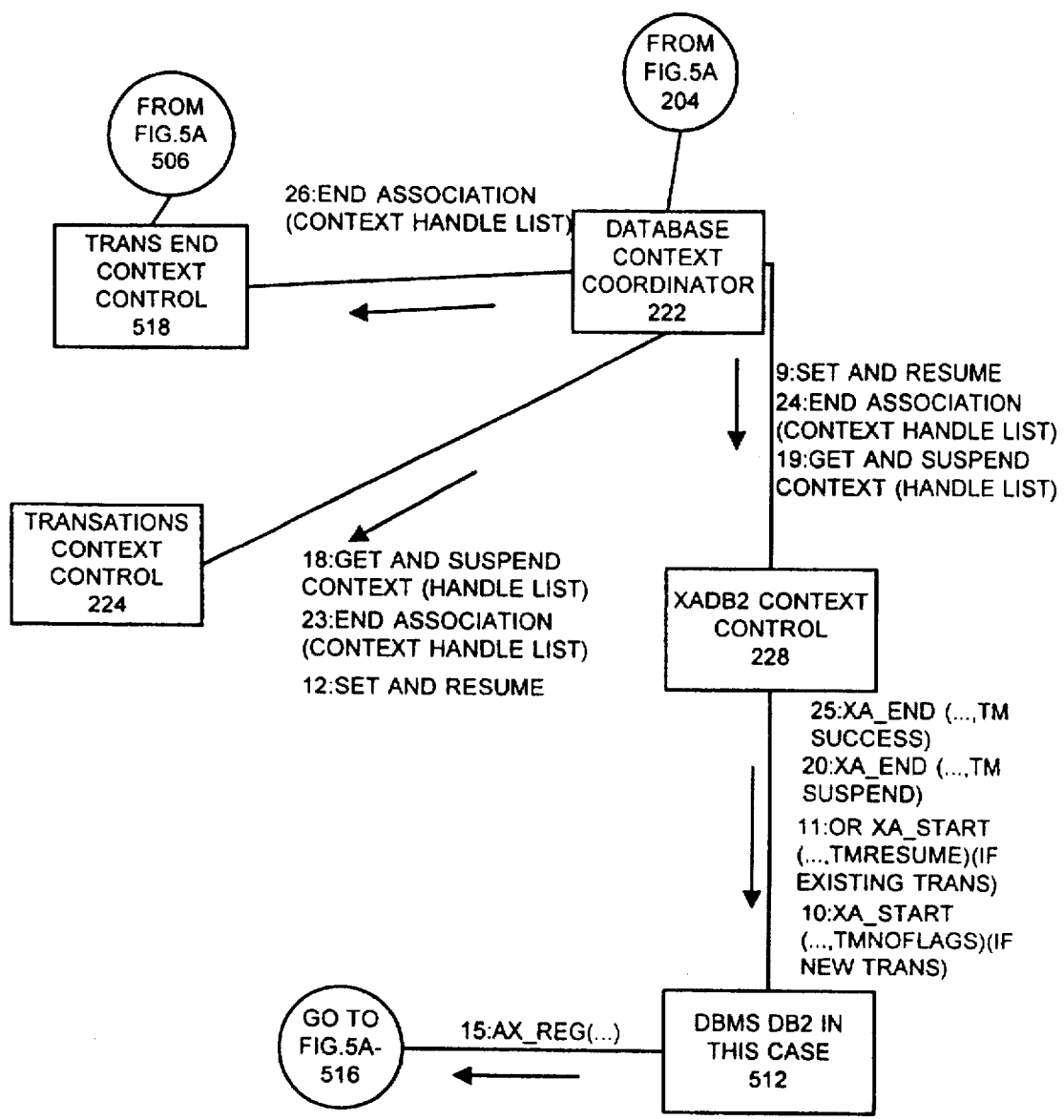
Figure 5C:
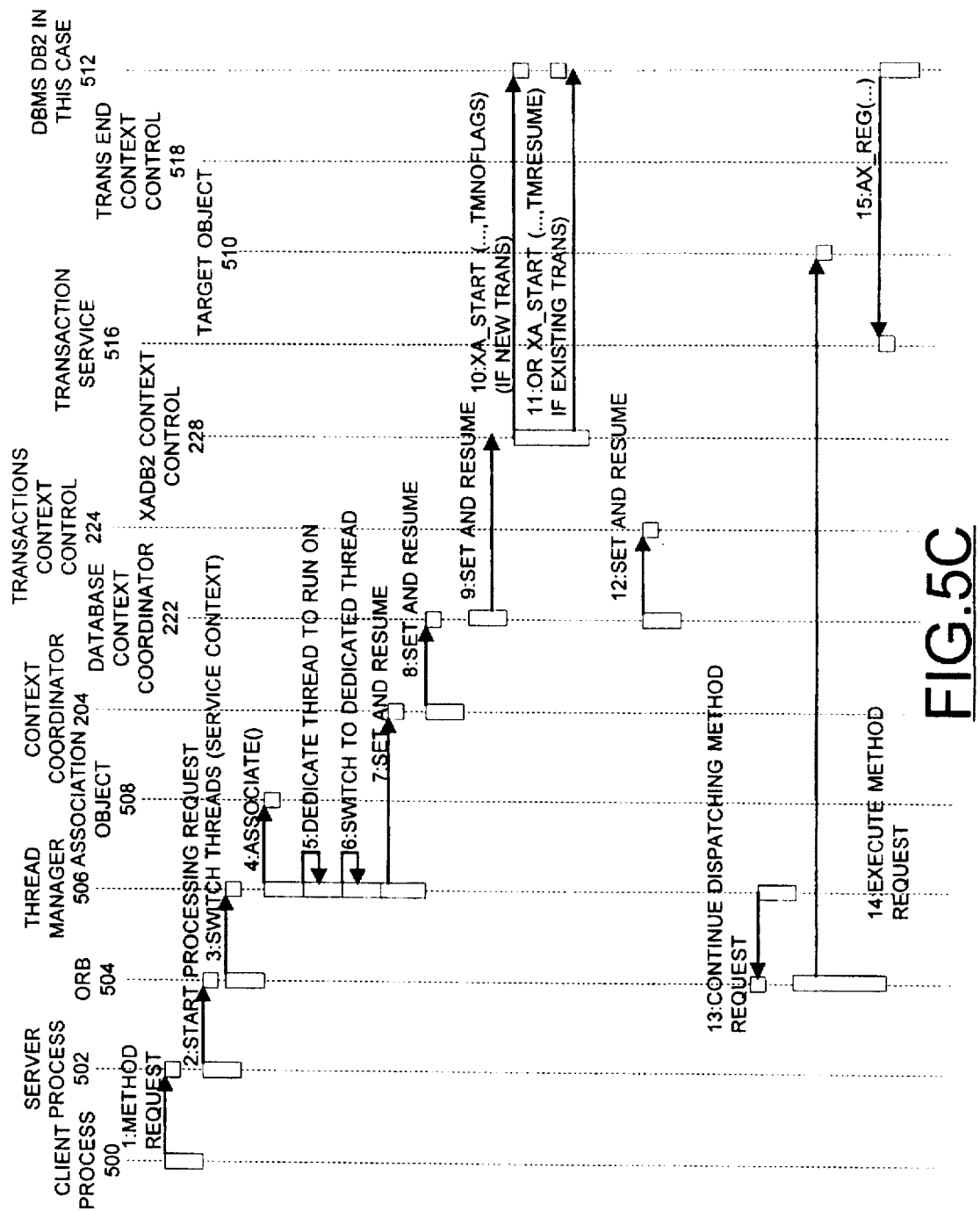
Figure 5D:
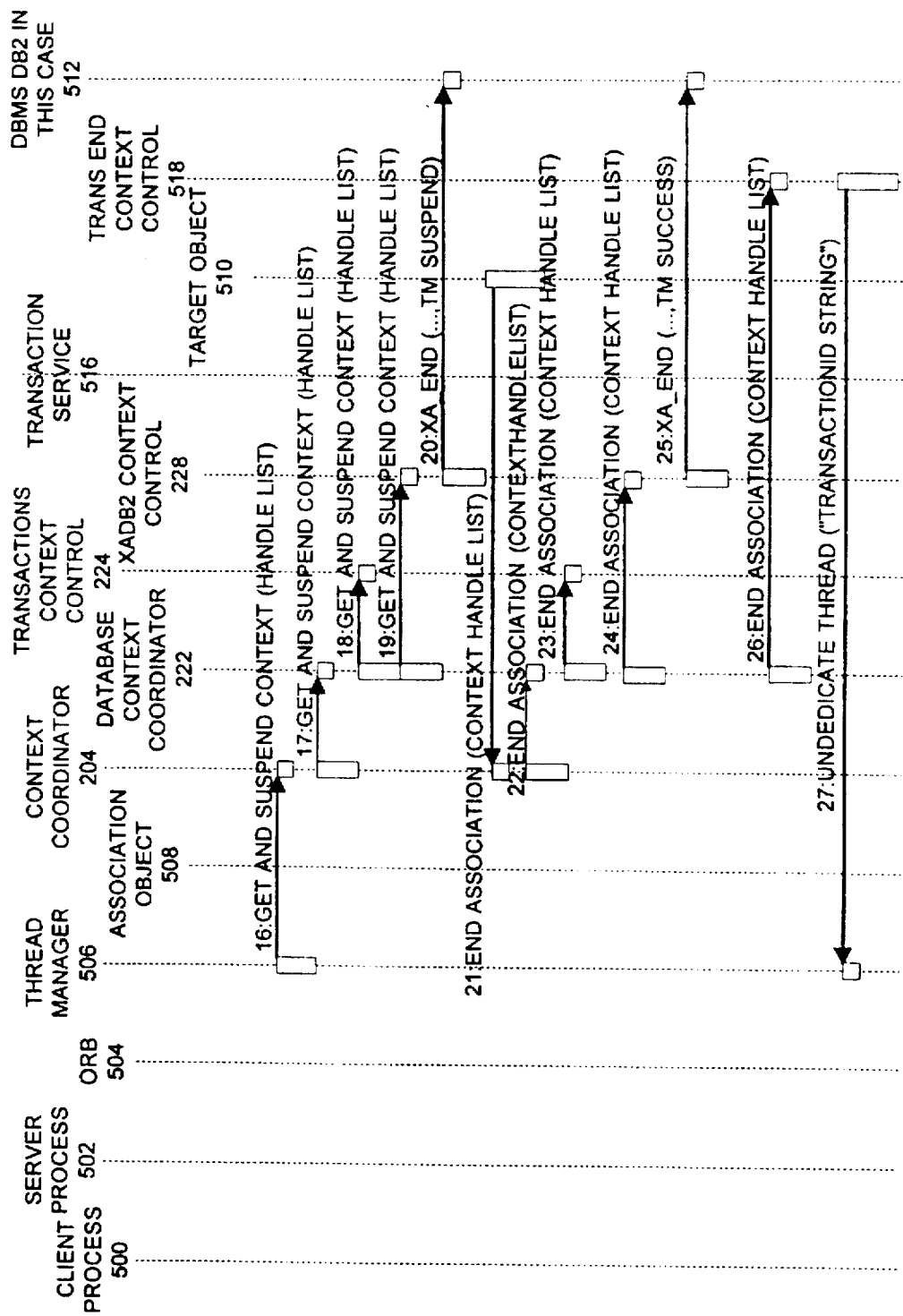

After a server process has completed initialization, but before the server process 502 of FIG. 5A starts accepting method requests from a client process 502, the init() method 142 is called on the main ContextCoordinator 204. ContextCoordinator 204 calls the init() method 142 on each ContextControl object 140 which is registered with it. As illustrated and described with respect to FIGS. 3A, 3B and 4A and 4B, the ContextCoordinator 204 calls the init() method 142 on the DatabaseContextCoordinator 222. The DatabaseContextCoordinator 222 calls the init() method 142 on selected specialized ContextControl 224, 226, 228 which is registered with it. The functions performed in the init() method 142 are those that specifically require other objects, for example, other ContextControl Objects 140, to have already been created. The functions performed in the init()

method 142 include those that those requiring a specific order of object initialization. For example, utilizing the init() method 142, the DatabaseContextCoordinator 222 coordinates the order of initialization by calling the init() method on multiple specialized ContextControl objects in a specific order. For example, after having been registered with ContextCoordinator 204, DatabaseContextCoordinator 222 calls the init() method in the following order. For example, XADB2ContextControl::init() is called then, TransactionsContextControl::init() is called.

The uninit() method 144 is called after a ThreadManager 506 has destroyed all of its threads, but before it deletes the ContextCoordinator 204. The uninit() method is called on the ContextCoordinator 204 and the ContextCoordinator 204 calls the uninit method 144 on each ContextControl object 140 which is registered with it. As illustrated and described with respect to FIGS. 9A, 9B and 10A and 10B, the ContextCoordinator 204 calls the uninit() method 144 on the DatabaseContextCoordinator 222. The DatabaseContextCoordinator 222 calls the uninit() method 144 on selected specialized ContextControl 224, 226, 228 which is registered with it. The uninit method 144 functions as a destructor, with an added benefit that other ContextControl objects 140 it may need will still be there.

Figure 6A:
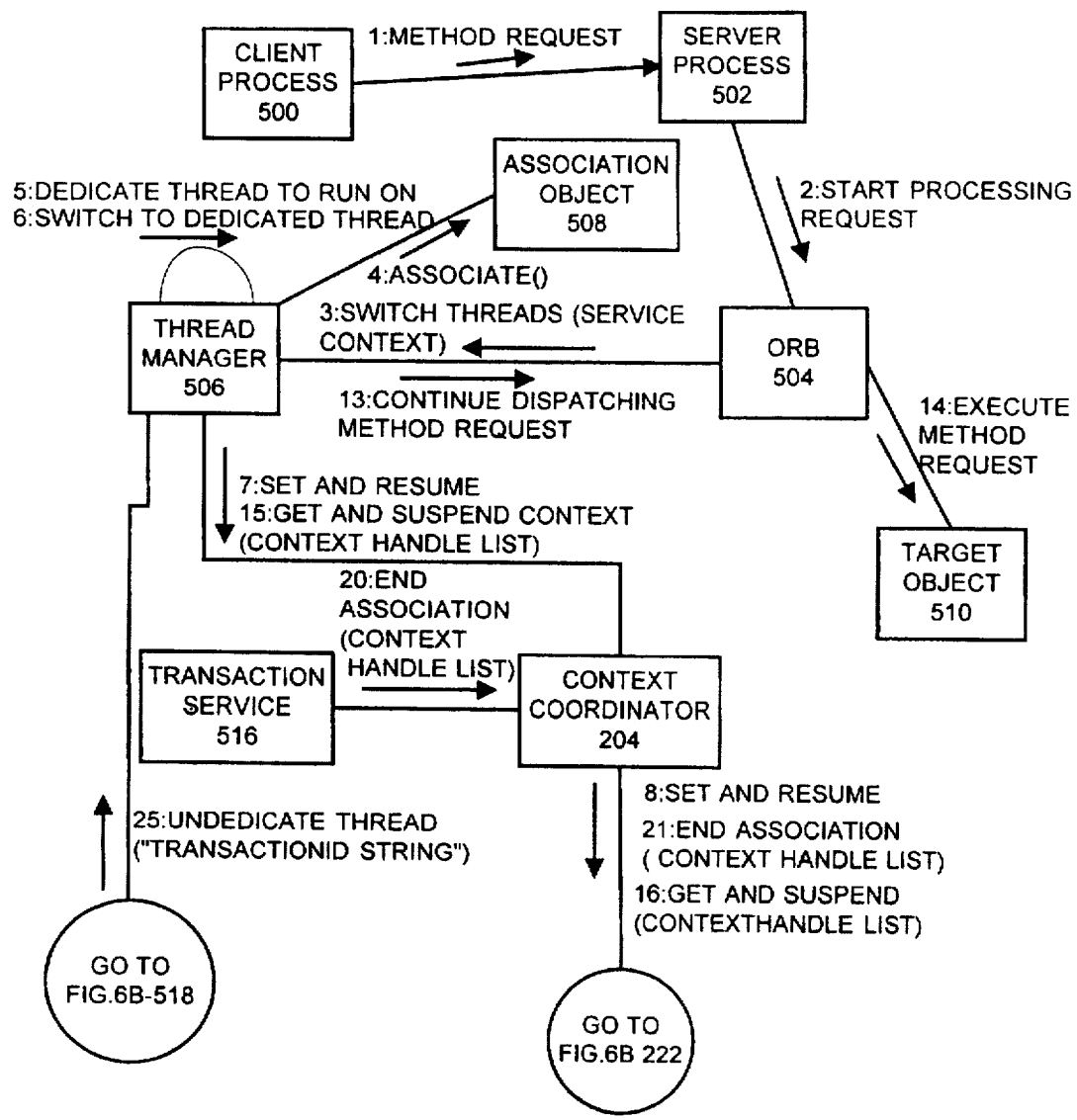
Figure 6B:
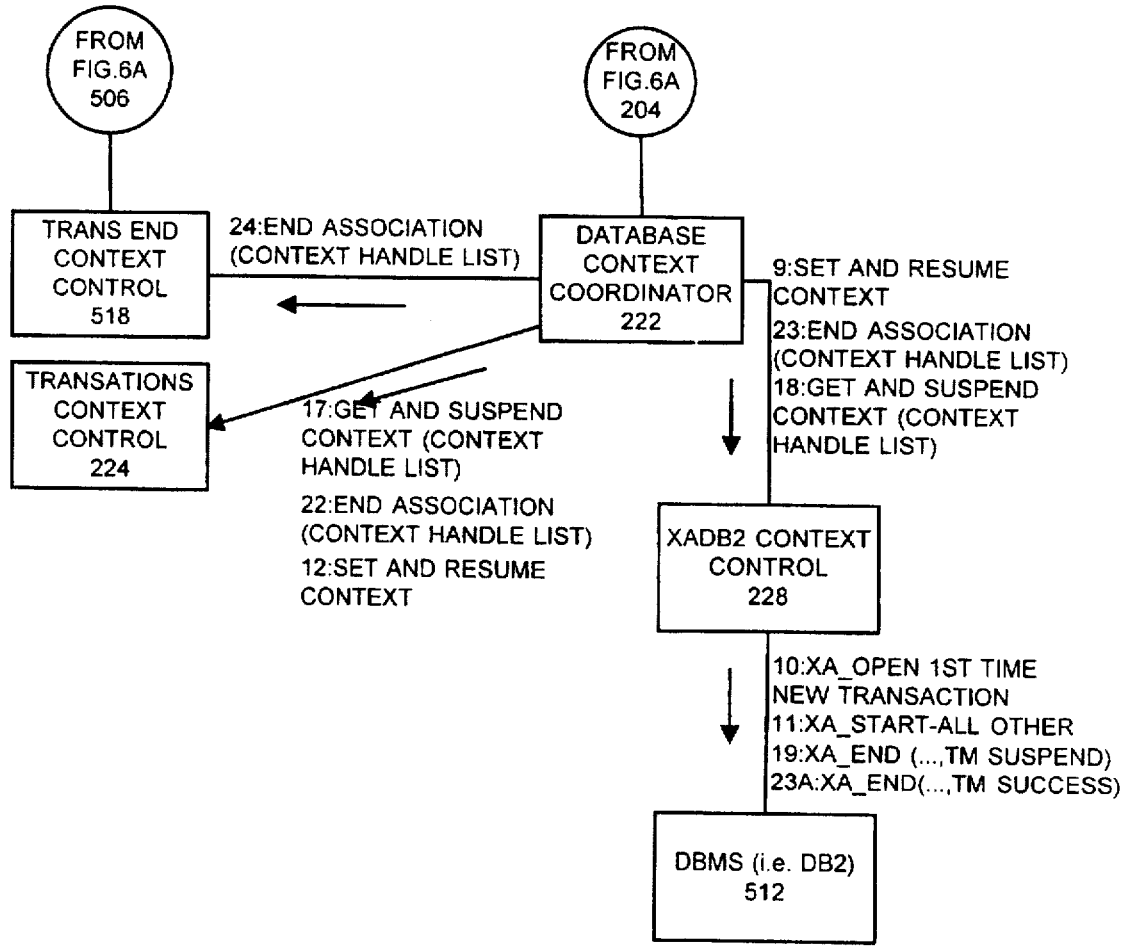
Figure 6D:
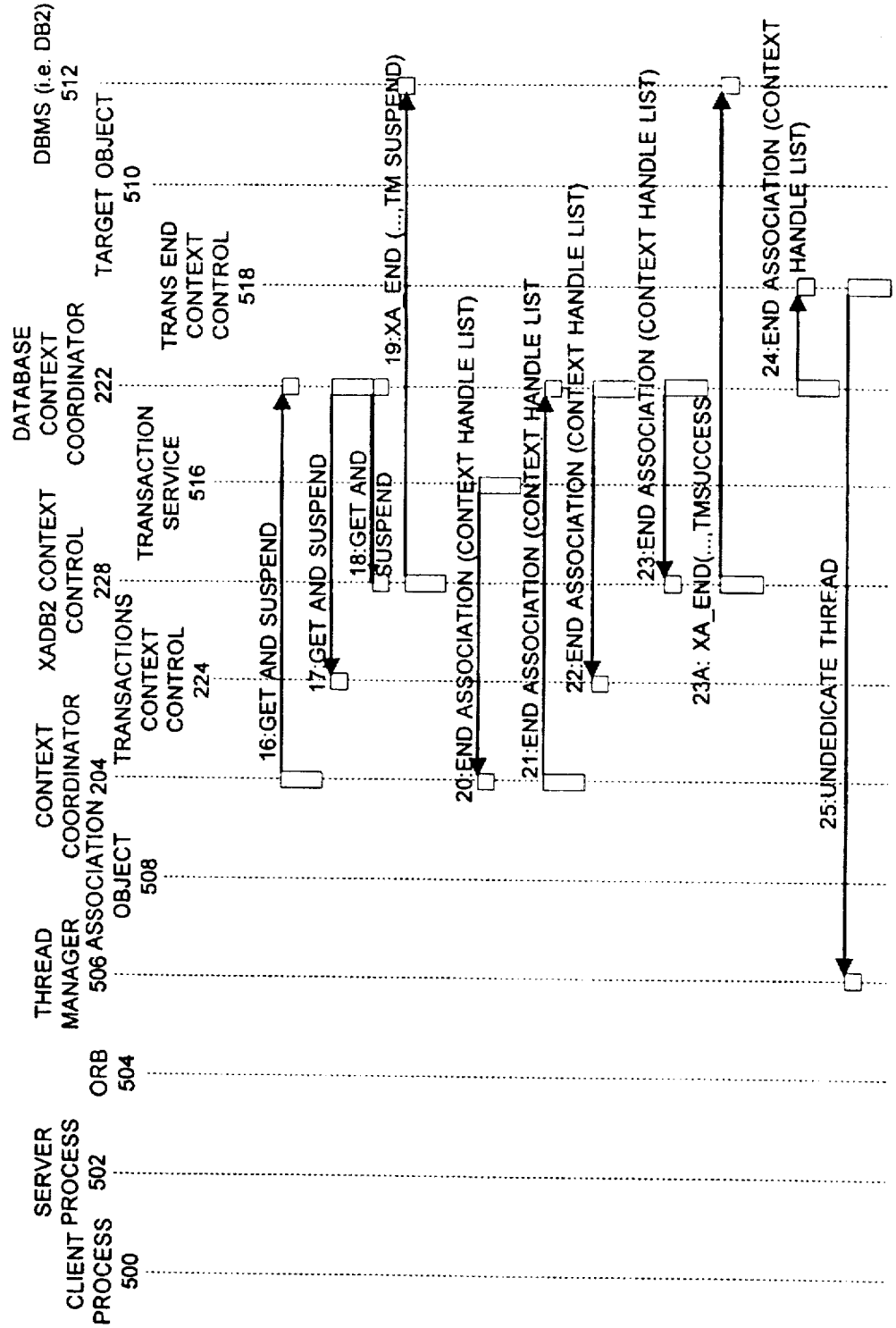
Figure 7A:
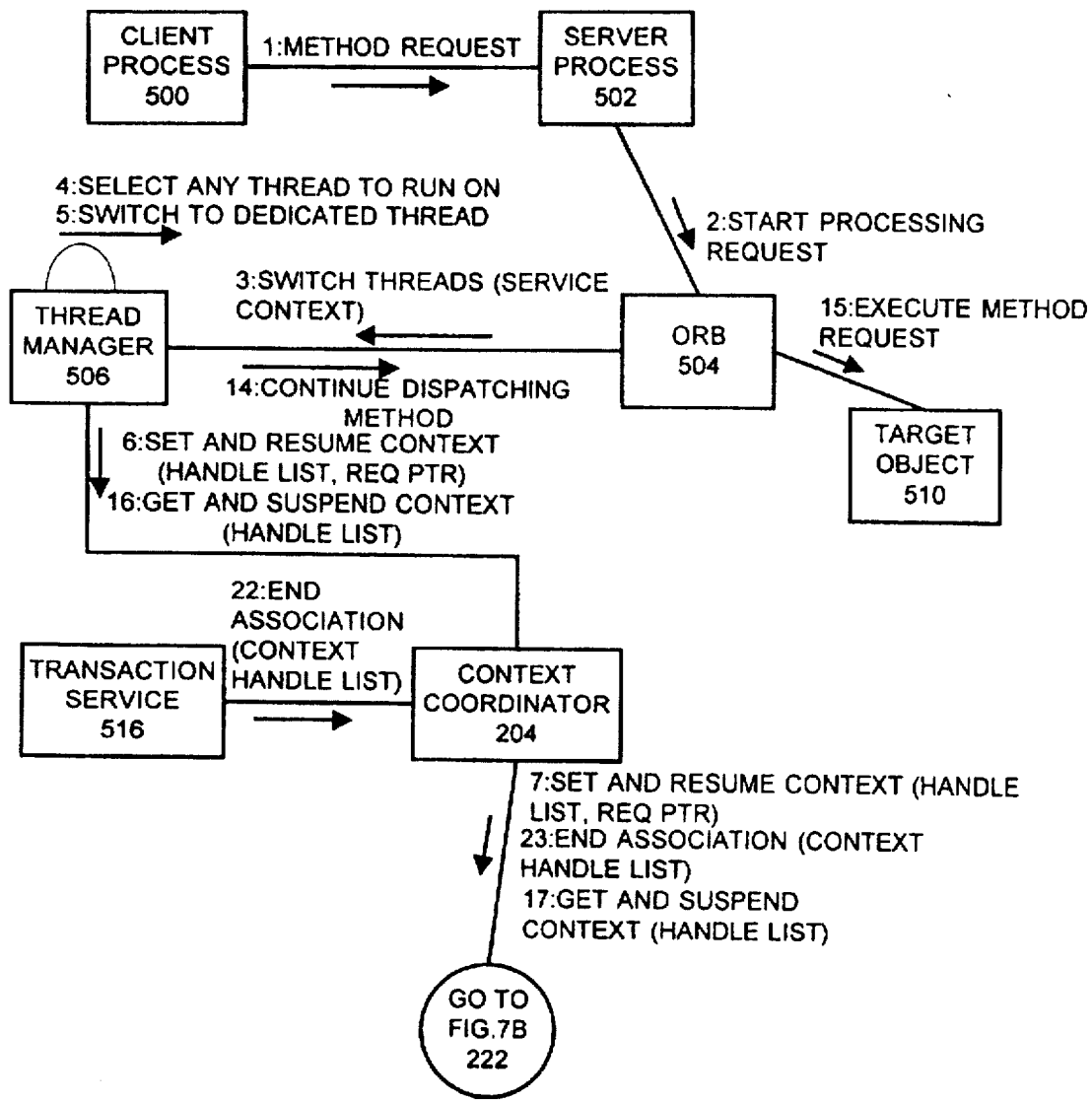
Figure 7B:
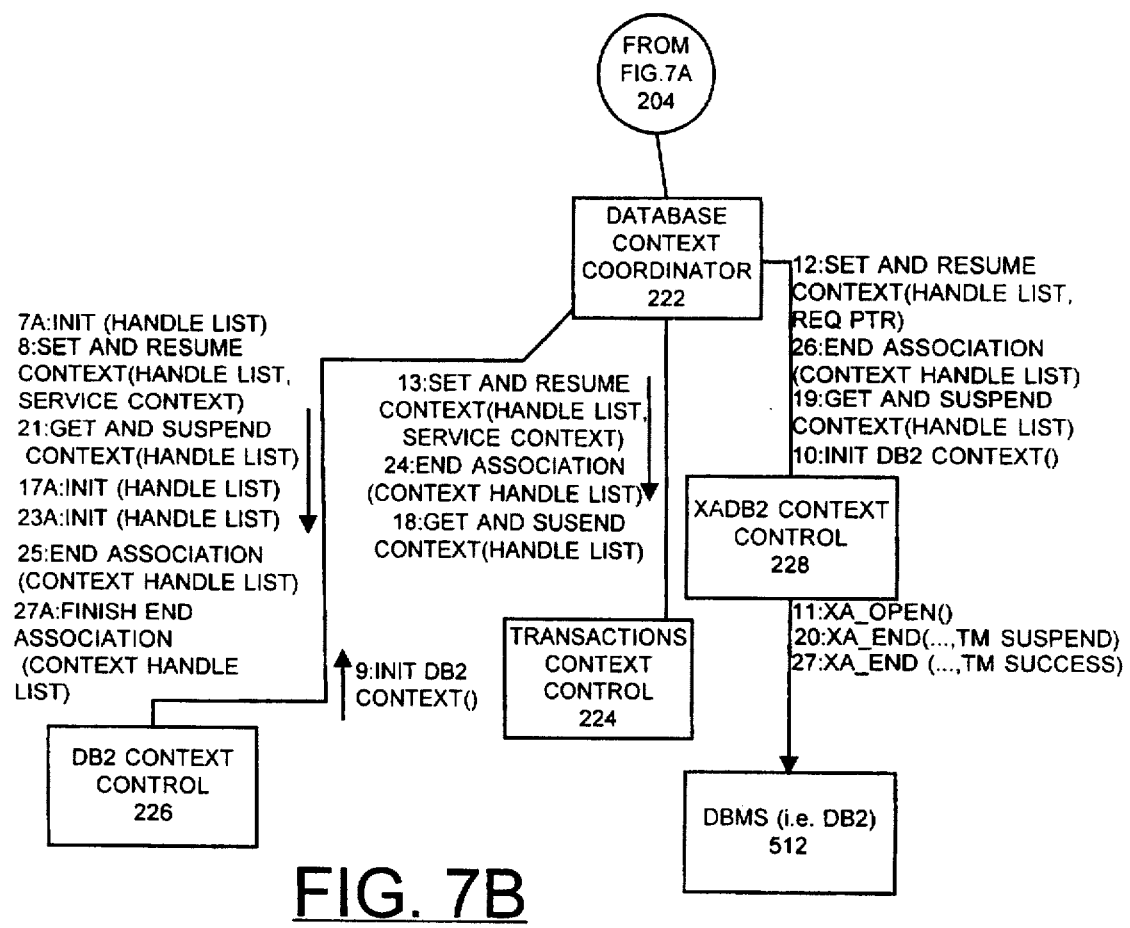
Figure 7D:
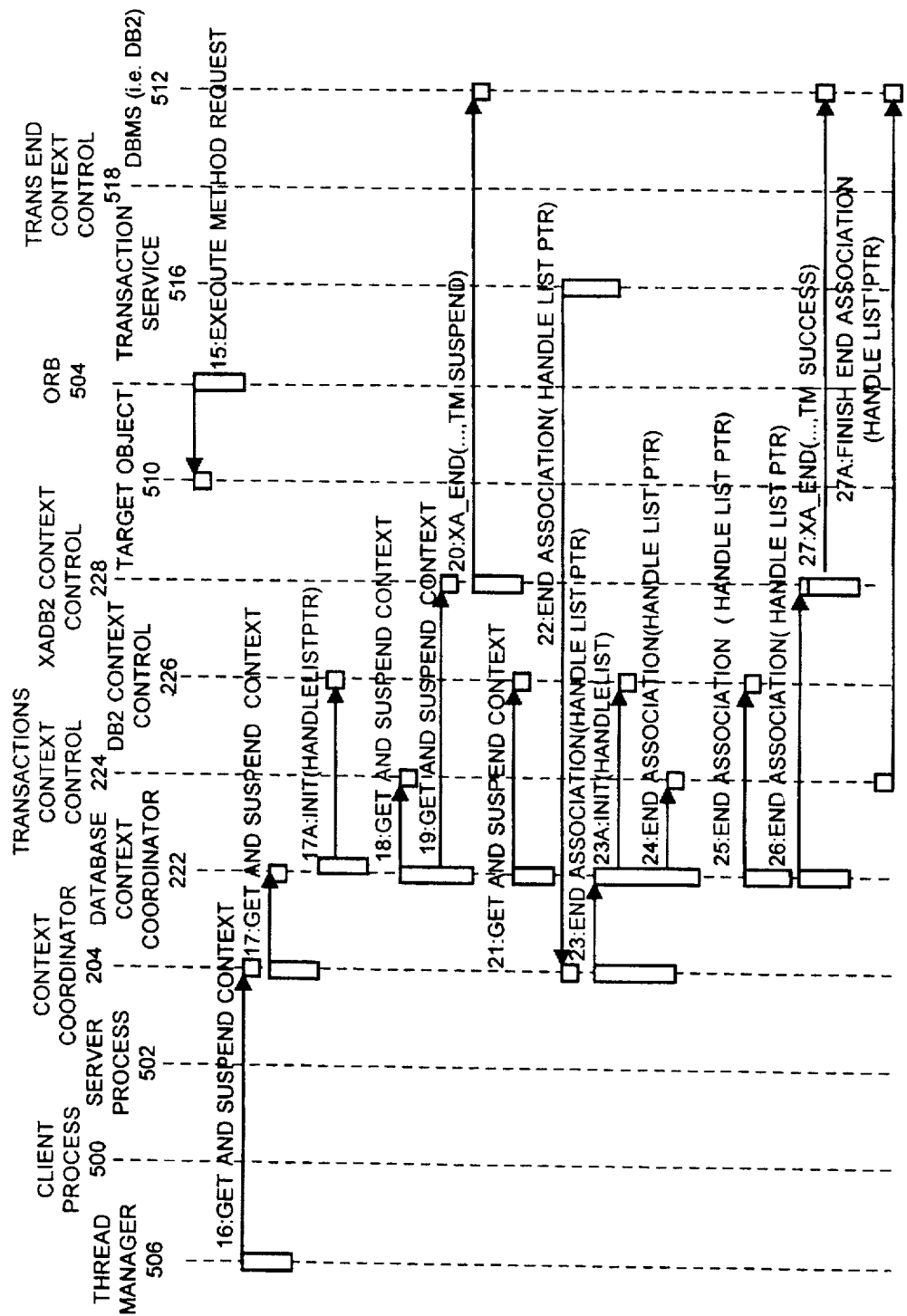

The getAndSuspendContext(ContextHandleList) method 146 is called to allow a service, such as a transaction service 516 of FIG. 5A or FIG. 6A, to suspend its association of context with the current thread 138, and return a context handle to the suspended context via the ContextHandleList 206. For services which cannot move context between threads 138, then these services do nothing or perform no operation responsive to the getAndSuspendContext (ContextHandleList) method 146 being called. For services which can move their context between threads 138, then these services remove the current context from the current thread 138 and pass back a handle to the suspended context. If this particular service must have a context on the thread 138 it would then place a default context on the thread. The getAndSuspendContext() method 146 implemented for a particular service places a handle to the context it just removed into the ContextHandleList 206 which is then returned to the ContextCoordinator 204.

The setAndResumeContext() method 148 is called to allow a particular object service 134 to optionally place a different context, provided in the ContextHandleList and/or the ServiceContext, onto the current thread 138 and allow the service to establish an association between the context and the thread. After all ContextControl objects 140 and the specialized ContextControls 224, 226 and 228 have executed this method 148 the thread 138 should be in a state ready to execute the request. It should be understood that the setAndResumeContext method 148 may be run without a getAndSuspendContext method 146 having been previously run.

For example, the ServiceContext may be NULL, such as the case when the getAndsuspendContext method is called in the situation where a ServiceContext is not available or does not make sense for the call. Service context is received from outside the server process 502 when receiving a request, such as, is received with the method request of step 1 of FIGS. 5A, 5B, 6A, 6B, 7A, 7B, 8A and 8B. The ContextControl 202, TransactionContextControl 224, DB2Context Control 226 or XADB2ContextControl 228 receiving the setAndResumeContext method 148 takes an appropriate action when the ServiceContext is NULL.

Also, the ContextHandleList 206 may be NULL, such as the case when a getAndSuspendContext method 146 was not called prior to this call for the setAndResumeContext() method 148. Then the ContextControl objects 140 take the appropriate action. For the first type of services which cannot move context between threads 138, the first type of services establish a context if one has not already been established. For the second type of services which can move their context between threads 138, when the service keeps an association between a context and some attribute, such as, transactionID and it was the first time the service 134 saw this attribute, then this attribute is associated to some default context and put on the thread 138. If the service kept an association between the context and some attribute like transactionID and it was not the first time it saw this attribute, it could choose whether to use the associated context or the service context passed in on the setAndResumeContext call.

The copyContext(ContextHandleList) method 150 is called to allow copying the current context from one thread 138 to another without suspending the source thread 138. This function of method 150 enables spawning a new thread 138 to have the new thread inherit context from the first thread 138 without suspending or removing the context from the first source thread 138. Relative to DatabaseContextCoordinator 222, copycontext is not a valid call, since the same context is not allowed to be enabled or active on more than one thread 138 at a time.

The endAssociation(ContextHandleList) method 152 is called to notify all dependent services to end their association for those services which keep an association between some attribute, like transactionID, and some context. The ContextHandleList 206 should, at a minimum, contain the ContextHandle for that service which the other services are dependent. For example, when a transaction service 516 ends a transaction, the association between the transactionID and the matching context needs to end. The transaction service 516 puts its context, which contains the transactionID, in the ContextHandleList 206 and calls the endAssociation method 152. A particular ContextControl 202, TransactionContextControl 224, DB2Context Control 226 or XADB2ContextControl 228 for dependent services looks in the transaction service context to find the transactionID and end the association. Then, the ContextControl 202 optionally can simply delete its context, or change it into a default context, or simply mark it as reusable for a future transaction. For those ContextControl Objects 140 which do not care about this association, the endassociation method 152 provides no operation. If the ContextHandleList 206 is NULL, this indicates that the thread 138 is about to be removed from the process and any thread related cleanup is then provided.

Whenever a ContextControl 202, TransactionContextControl 224, DB2Context Control 226 or XADB2ContextControl 228 is asked to perform an operation, for example the getAndSuspendContext method 146, it is provided a ContextHandleList 206, the ContextControl object gathers any context information it keeps which it wants to forward to a potential setAndResumeContext call and places it in the ContextHandleList 206. The context information needs to be place in global storage, such that another thread 138 can access it later. The ContextControl 202, TransactionContextControl 224, DB2Context Control 226 or XADB2ContextControl 228 then sets a pointer via ABCContextHandle 210 to this context into the ContextHandleList 206. All ContextControl objects 202 including the TransactionContextControl 224, DB2Context Control 226 and XADB2ContextControl 228 get the same getAndSuspendContext call, and, when finished, the ContextHandleList 206 contains the contexts for all Context-Control objects. If the context is now to be moved to a new thread 138, a call goes out to all the ContextControl 202 including TransactionContextControl 224, DB2Context Control 226, and XADB2ContextControl 228 to setAndResumeContext, and they would be passed the ContextHandleList 206. Each ContextControl object could use the information in the context contained in the ContextHandleList 206 to help set their context up on the new thread 138.

The ContextCoordinator 204 is responsible for coordinating the actions of multiple ContextControl objects 140. Any requirements of relationships between the ContextControl objects is handled by an implementation of ABCContextCoordinator 216. DatabaseContextCoordinator 222 handles relationships between the TransactionContextControl 224, DB2Context Control 226 and XADB2ContextControl 228. The ContextCoordinator 204 manages the calls to the ContextControl objects 140 and DatabaseContextCoordinator 222 in multiple situations including as requests are received into the server, as replies are sent from the server, and as threads are destroyed. Each service 134 that bases any behavior on the information on the thread 138 should have a ContextControl object 140 registered with the ContextCoordinator 204.

Referring now to FIGS. 1C, 2A, 2B, 3A, 3B, 4A, 4B, 5A, 5B, 6A, 6B, 7A, 7B, 8A, 8B, 9A, 9B, 10A, and 10B, the methods 142, 144, 146, 148, 150 and 152 and the operation of context manager 132 may be understood as follows. High level flow charts of call sequences are shown for creation of a DatabaseContextCoordinator 222, execution when a request method comes into the server, and server shutdown. For purposes of simplicity in each of the following sequences, the ContextControl object is described for the case where the set of ContextControls are provided only for a DBMS of the type specified. It should be understood that various sets of ContextControls may be used for multiple types of DBMSs.

FIGS. 3A, 3B, 5A, 5B, 5C, 5D, 6A, 6B, 6C, 6D, 9A and 9B cover DBMSs for which a transaction cannot move from one thread 138 to another. These call sequences are the same for all DBMSs in this category. FIGS. 5A, 5B, 5C, 5D illustrate an exemplary execution sequence for DBMSs for which a transaction cannot move from one thread 138 to another thread and only one transaction may be active on a thread at a time. FIGS. 6A, 6B, 6C, 6D illustrate an exemplary execution sequence for DBMSs for which a transaction cannot move from one thread 138 to another while multiple transactions may be active on a thread at a time. FIGS. 4A, 4B, 7A, 7B, 7C, 7D, 10A and 10B cover DBMSs for which manual transaction migration is supported, or in other words which may allow transactions to be moved from one thread 138 to another and provide an application program interface (API) to manually do this. FIGS. 3A, 3B, 5A, 5B, 5C, 5D, 6A, 6B, 6C, 6D, 9A and 9B cover DBMSs for XA association migration or which may allow transactions to be moved from one thread 138 to another and handle the move automatically by supporting XA association migration.

Figure 3A:
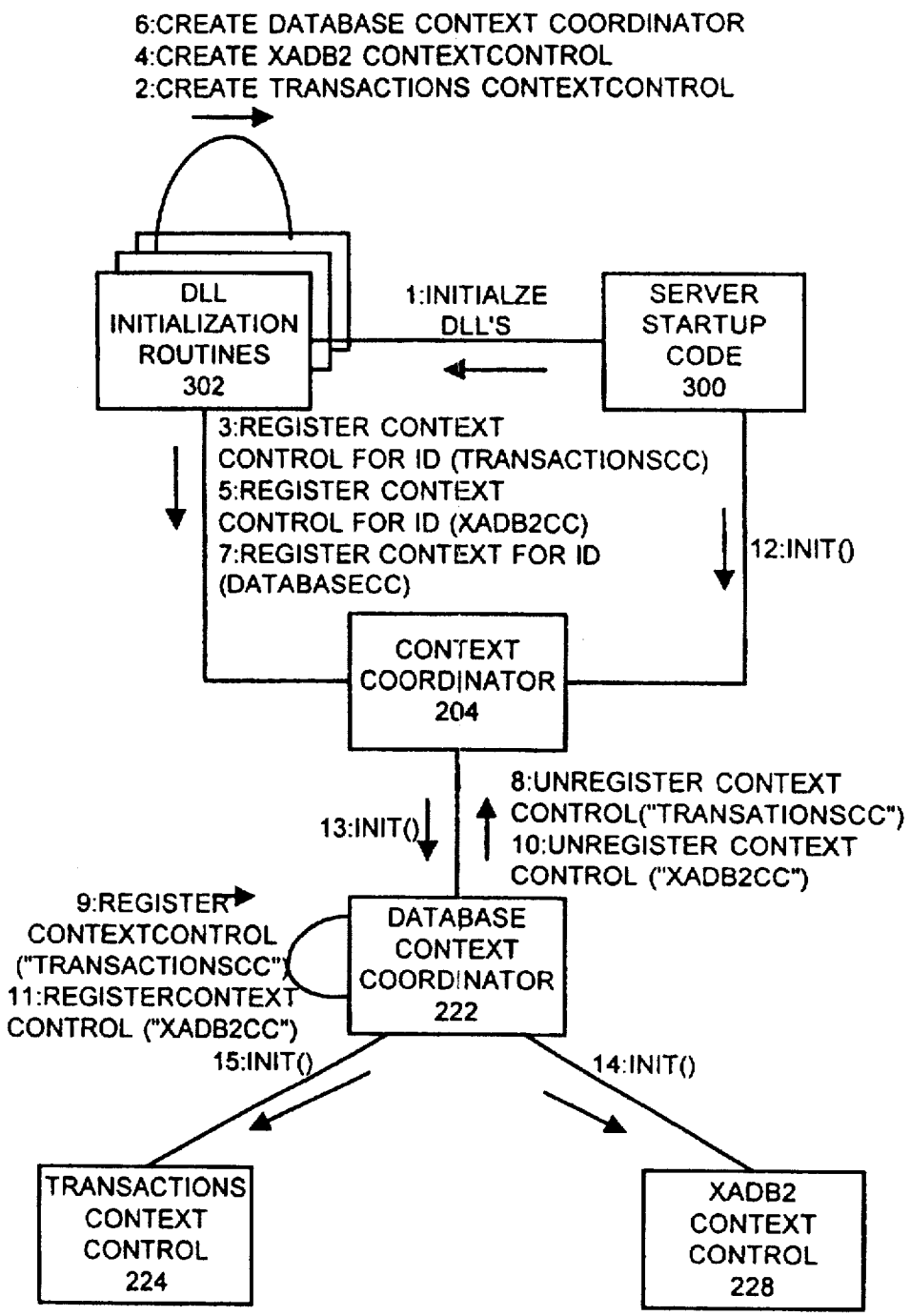
FIGS. 3A and 3B together provide a flow chart illustrating exemplary sequential steps or calls for creation of a specialized ContextCoordinator for DBMSs for which 1) a transaction cannot move from one thread to another or for which no transaction migration with one transaction active at a time; 2) no transaction migration with multiple transactions active at a time; and 3) a transaction can be moved from one thread to another via XA association migration in accordance with the preferred embodiment.
Figure 3B:
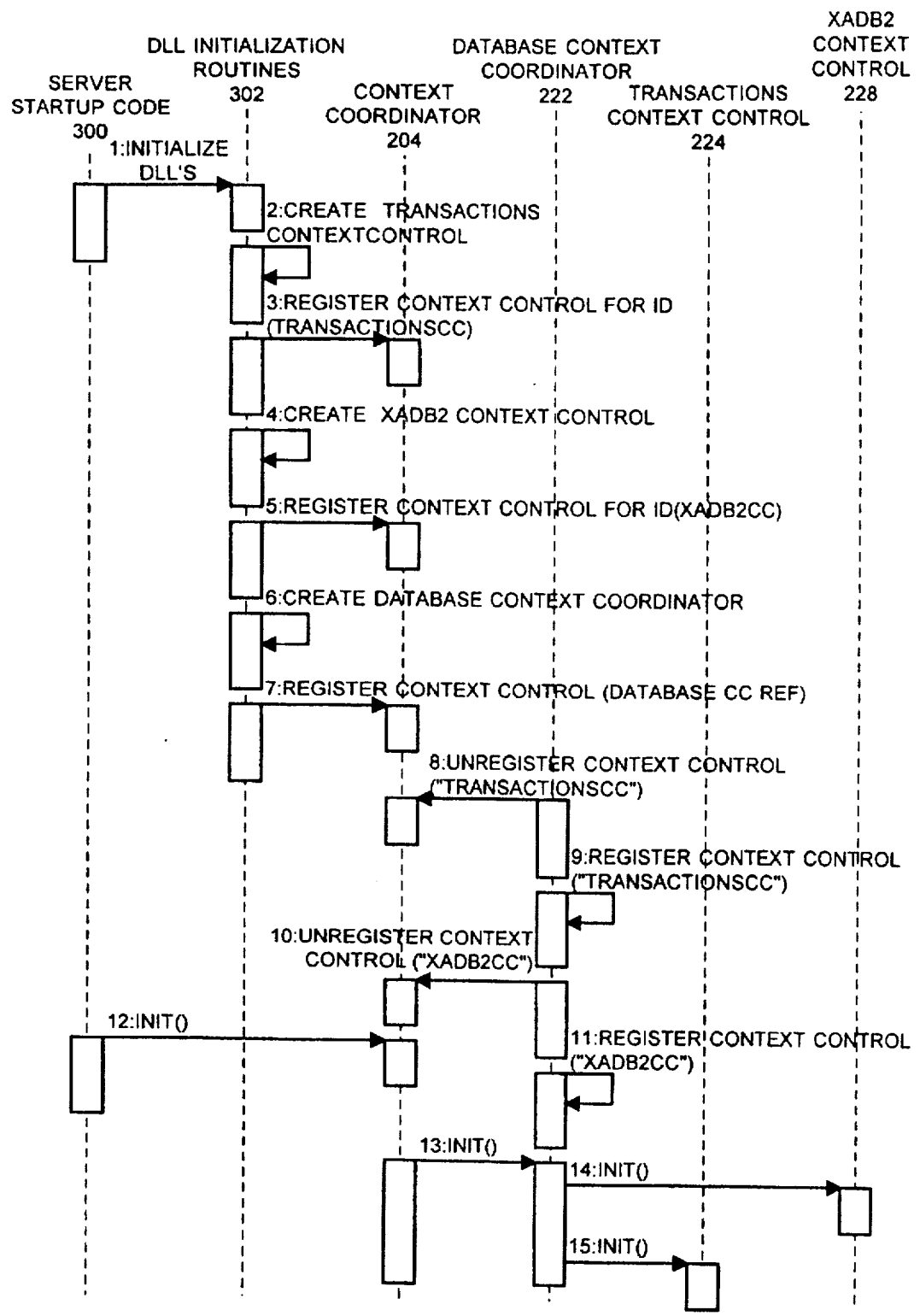

FIGS. 3A and 3B illustrate exemplary sequential calls for creation of the specialized DatabaseContextCoordinator 222 in accordance with the preferred embodiment. The creation call sequence of FIGS. 3A and 3B is the same for DBMSs server process with no transaction migration and with one transaction active at a time; no transaction migration with suspension supported for multiple transactions per thread; and where a transaction can be moved from one thread 138 to another using XA association migration.

In FIG. 3A and 3B, the creation call sequence begins with the server runtime code 300 calling a sequence of dynamic link libraries (DLLs) 302 and calling an initialization function on them at step 1. At steps 2–6, DLL initialization functions include constructing and registering with the top level ContextCoordinator 204 the following objects, the XADB2ContextControl 228, the TransactionsContextControl 224, and the DatabaseContextCoordinator 222. Within the constructor of DatabaseContextCoordinator 222, both the TransactionsContextControl 224 and the XADB2ContextControl 228 are unregistered from the top level ContextCoordinator 204 and registered with the DatabaseContextCoordinator 222 as shown at steps 8, 9, 10 and 11. The order dependency that this overcomes is that the constructor for DatabaseContextCoordinator 222 expects both ContextControls 224, 228 to be already registered with the top level ContextCoordinator 204.

At step 12, server startup code 300 calls the init() method on the ContextCoordinator 204. At step 13, ContextCoordinator 204 calls the init() method on the DatabaseContextCoordinator 222. After the DLL initialization functions have been called, all objects of both the TransactionsContextControl 224 and the XADB2ContextControl 228 are in the proper state, so that they can handle a call to their init() method in a desired order. At step 14, XADB2ContextControl::init() is called. At step 15, TransactionsContextControl::init() is called.

FIGS. 4A and 4B illustrate exemplary sequential calls for creation of the specialized DatabaseContextCoordinator 222 in accordance with the preferred embodiment for which a transaction can be manually moved from one thread 138. The creation call sequence of FIGS. 4A and 4B is the same for DBMSs which support manual transaction migration. The creation call sequence begins with the server startup code 300 calling a sequence of dynamic link libraries (DLLs) 302 and calling an initialization function on them at step 1. At steps 2–9, DLL initialization functions include constructing and registering with the top level ContextCoordinator 204 the following objects, the TransactionsContextControl 224 DB2ContextControl 226, the XADB2ContextControl 228 and the DatabaseContextCoordinator 222. Within the constructor of DatabaseContextCoordinator 222, the TransactionsContextControl 224, DB2ContextControl 226, and the XADB2ContextControl 228 are unregistered from the top level ContextCoordinator 204 and registered with the DatabaseContextCoordinator 222 as shown at steps 10 to 15. The order dependency that this overcomes is that the constructor for DatabaseContextCoordinator 222 expects ContextControls 224, 226, and 228 to be already registered with the top level ContextCoordinator 204.

At step 16 server startup code 300 calls the init() method on the ContextCoordinator 204. At step 17 ContextCoordinator 204 calls the init() method on the DatabaseContextCoordinator 222. After the DLL initialization functions have been called, all objects of the TransactionsContextControl 224, DB2ContextControl 226, and the XADB2ContextControl 228 are in the proper state, so that they can handle a call to their init() method in a desired order. At step 19, XADB2ContextControl::init() is called. At step 20, TransactionsContextControl::init() is called. At step 21, DB2ContextControl::init() is called.

FIGS. 5A, 5B, 5C, and 5D illustrate exemplary sequential calls when a request to execute a method is received by a server process 502. The DBMS does not support transaction migration, and only allows one transaction to be active at a time in accordance with the preferred embodiment. In step 1, a request to execute a method is received by a server process 502 from a client process 500 for a transaction that is new to the server. In step 2, the server process 502 calls an object request broker (ORB) 504 with a start processing request. ORB 504 calls a switch threads (service Context) to thread manager 506.

The work for this transaction must be dedicated to a thread. If this is a new transaction which began outside the server process and the current method request is to be part of that transaction, then the ThreadManager 506 calls an associate() method on an AssociationObject 508 at step 4. Typically, the transaction service has created and registered an AssociationObject with the ThreadManager 506. The associate() method will return an AssociationString, which in this case the string will be the transactionID. At step 5, the ThreadManager 506 will use this Associationstring to have this transaction dedicated to a particular thread 138. This dedication is one-to-one, i.e., one transaction to one thread 138.

If a method is already executing on the server and it starts a transaction, then the transaction service must call the ThreadManager dedicateCurrentThread(AssociationString) method to have the current thread dedicated to the new transaction.

Next the thread associated with the TransactionID for this transaction is selected for the method to run on at step 6. At step 7, thread manager 506 calls the setAndResumeContext on the context coordinator 204. At step 8, setAndResumeContext(ABCContextHandleListPtr, Service Context) is called on the DatabaseContextCoordinator 222. DatabaseContextCoordinator 222 will first call DB2ContextControl::initHandleList(). This method will ensure that the context handle list is initialized properly with the correct DB2 context handle. Then, it will call setAndResumeContext(ABCContextHandleListPtr, Service Context) on each ContextControl that is registered with it in the following order. At step 9, DB2XAContextControl::setAndResumeContext (ABCContextHandleListPtr, Service Context) is called.

If this is a new transaction and the DBMS uses static registration, then XAContextControl::setAndResumeContext (ABCContextHandleListPtr, Service Context) will call xa_start(.., TMNOFLAGS) on the DBMS, at step 10. If this is not a new transaction and the DBMS uses static registration, it will call xa_start(.., TMRESUME), at step 11 At step 12. TransactionsContextControl::setAndResumeContext (ABCContextHandleListPtr, Service Context) is called. TransactionsContextControl 224 resumes its context on the thread 138 and places the transactionID of the current transaction in the ContextHandleList 206 for use by the other ContextControls.

At step 13, thread manager 506 calls ORB 504 to continue dispatching method request. At step 14, ORB 504 calls an execute method request on the target object 510. If the DBMS uses dynamic registration, transaction service 516 will receive an ax_reg(..) from the database 512, at step 15. This happens the first time the code makes a (SQL) call on the DBMS, provided the DBMS uses dynamic registration, transaction service 516 will receive the ax_reg(..) from the DBMS. Then the method code on the target objects 510 runs to completion.

When the method request finishes execution, the context is suspended, thread manager 506 calls ContextCoordinator 204 at step 16. ContextCoordinator 204 calls DatabaseContextCoordinator 222 at step 17. DatabaseContextCoordinator 222 with a getAndSuspendContext (ABCContextHandleListPtr), at step 17. DatabaseContextCoordinator 222 will call this method on each ContextControl that is registered with it in the order of steps 18 and 19. TransactionsContextControl::getAndSuspendContext is called at step 18. TransactionsContextControl 224 suspends its context on the thread 138 and places the transactionID of the current transaction in the ContextHandleList 206 for use by the other ContextControls. XADB2ContextControl::getAndsuspendContext (ABCContextHandleListPtr) is called at step 19. XADB2ContextControl 228 will call xa_end(.., TMSUSPEND) on the Database 512 at step 20.

When other method requests within this transaction are made, steps 1–19 are repeated until the transaction is ready to end.

When the transaction is ended, the transaction service 516 calls the ContextCoordinator 204 at step 21. The ContextCoordinator 204 calls endAssociation (ABCContextHandleListPtr) on the DatabaseContextCoordinator 222 at step 22. DatabaseContextCoordinator 222 will call this method on each ContextControl it has registered with it in the following order. DatabaseContextCoordinator 222 calls endAssociation (ABCContextHandleListPtr) on the TransactionsContextControl 224 at step 23. TransactionsContextControl 224 does nothing. DatabaseContextCoordinator 222 calls endAssociation(ABCContextHandleListPtr) on the XADB2ContextControl 228 at step 24. XADB2ContextControl::endAssociation (ABCContextHandleList Ptr) will call xa_end(.., TMSUCCESS) on the database 512 at step 25.

At steps 26 and 27, a special ContextControl object. TransactionEndContextControl 518, whose sole purpose is to communicate to the ThreadManager 506 the fact that the transaction is over and that the dedication of this transaction to this thread can be ended, has been registered with the DatabaseContextCoordinator 222. The TransactionEndContextControl 518 only implements the endAssociation method. The DatabaseContextCoordinator 222 will call the TransactionEndContextControl 518 last, at step 26. When its endAssociation(ABCContextHandleListPtr) is called, TransactionEndContextControl 518 will look for a transactionID passed in via one of the context in the ContextHandleList 206. At step 27, TransactionEndContextControl 518 will then call undedicateThread(AssociationString) on the ThreadManager 506, where the AssociationString will have the transactionID.

FIGS. 6A, 6B, 6C, and 6D together provide a flow chart illustrating exemplary sequential calls when a request to execute a method on an object is received by a server process when the DBMS does not support transaction migration, but does allow multiple transactions per thread in accordance with the preferred embodiment. FIGS. 6A, 6B, 6C, 6D covers DBMSs for which a transaction cannot move from one thread to another, while multiple transactions may be in progress on any given thread 138. This type of DBMS allows one to suspend one transaction and resume a different transaction on a given thread 138, provided that the transaction always runs on the same thread 138.

At step 1, a method request from a client process 500 is received by a server process 502 for a transaction that is new to the server. The work for this transaction must be dedicated to a thread 138. If this is a new transaction which began outside the server process 502 and the current method request is to be part of that transaction, then the thread manager 506 will call the associate() method on an AssociationObject 508. Presumably, the transaction service created and registered an AssociationObject with the Thread- Manager 506. The associate() method will return an AssociationString. This sequence differs from FIGS. 5A, 5B, 5C, 5D in the fact that the database supports multiple transactions active on a given thread 138. This means that the association object could internally map many transactions to the same associationString and thus map multiple transactions to the same thread via the ThreadManager 506. The ThreadManager 506 will use this AssociationString to dedicated a particular thread 138 or find an already dedicated thread 138. This dedication is many-to-one, i.e., multiple transactions to one thread 138.

If a method is already executing on the server and it starts a transaction, then the transaction service 516 must call the ThreadManager 506 to have the current thread dedicated to the new transaction.

When the thread is initialized, setAndResumeContext is called on ContextCoordinator 204 by thread manager 506 at step 7. Then DatabaseContextCoordinator::setAndResumeContext (ABCContextHandleListPtr, Service Context) is called at step 8. Then, DatabaseContextCoordinator 222 will call setAndResumeContext(ABCContextHandleListPtr, Service Context) on each ContextControl that is registered with it in the following order.

XADB2ContextControl::setAndResumeContext(ABCContextHandleListPtr, Service Context) is called at step 9. The first time XADB2ContextControl::setAndResumeContext is called for a particular thread 138, XADB2ContextControl will open connections (via an xa_open(..) call to the DBMS 512, to the appropriate databases at step 10 After the first time, every other time XADB2ContextControl::setAndResumeContext is called, XADB2ContextControl 228 will call xa_start(..) to the DBMS 512 at step 11. This call will make the association between the current transactions and the thread 138. In this way, the DBMS 512 can allow multiple transactions on a single thread 138.

TransactionsContextControl::setAndResumeContext is called at step 12. TransactionsContextControl 224 resumes its context on the thread 138 and places the transactionID of the current transaction in the ContextHandleList 206 for use by the other ContextControls. At step 13, thread manager 506 calls ORB 504 to continue dispatching method request. At step 14, ORB 504 calls an execute method request on the target object 510. Then the method code runs to completion.

When the thread 138 is suspended, thread manager 506 calls getAndSuspendContext on the ContextCoordinator 204 at step 15. At step 16, DatabaseContextCoordinator::getAndsuspendContext (ABCContextHandleListPtr) is called. Then, it will call getAndSuspendContext(ABCContextHandleListPtr) on each ContextControl that has registered with it in the following order.

TransactionsContextControl::getAndsuspendContext is called at step 17. TransactionsContextControl 224 suspends its context on the thread 138 and places the transactionID of the current transaction in the ContextHandleList 206 for use by the other ContextControls. XADB2ContextControl::getAndSuspendContext (ABCContextHandleListPtr) is called at step 18. XADB2ContextControl 228 must be called with a DB2 context still attached to the thread. At step 19, XADB2ContextControl::getAndsuspendContext will call xa_end(.. TMSUSPEND) suspending all databases which are in a state to be suspended.

if there is an active transaction, other method requests within this transaction come into the server. If so, steps 1–20 are repeated until the transaction is ready to end.

A transaction is ended, DatabaseContextCoordinator::endAssociation (ABCContextHandleListPtr) is called at step 21 by the ContextCoordinator 204. Then, XADB2ContextControl 228 will call endAssociation (ABCContextHandleListptr) on each ContextControl that has registered with it.

At step 22, TransactionsContextControl::endAssociation (ABCContextHandleListPtr) is called. It does nothing. At step 23, XADB2ContextControl::endAssociation (ABCContextHandleList Ptr) is called. At step 23A, xa_end (.... TMSUCCESS) is called on the DBMS 512 by XADB2ContextControl 228. The DatabaseContextCoordinator 222 will call the TransactionEndContextControl 518, at step 24. When its endAssociation (ABCContextHandleListPtr) is called, TransactionEndContextControl 518 will look for a transactionID passed in via one of the context in the ContextHandleList 206. At step 25, TransactionEndContextControl 518 will then call undedicateThread(transactionID String) on the ThreadManager 506.

FIGS. 7A, 7B, 7C, and 7D together provide a flow chart illustrating exemplary sequential calls when a request to execute a method on an object is received by a server process with manual transaction migration in accordance with the preferred embodiment. FIGS. 7A, 7B, 7C, and 7D covers DBMSs for which a transaction can be manually moved from one thread 138. It should be understood that such call sequences will vary depending on what APIs are made available to move a transaction. DB2 is used as an example here. In this sequence there is no need to dedicate threads 138 to transactions since the transactional context can be moved to any thread 138.

At steps 3–5 a thread is selected for a method to run on. Any criteria can be used to make the selection. The thread is initialized. At step 6, the thread manager 506 calls setAndResumeContext on the ContextCoordinator 222.

DatabaseContextCoordinator::setAndResumeContext (ABCContextHandleListptr, Service Context) is called at step 7.

DB2ContextControl::setAndResumeContext (ABCContextHandleListPtr, Service Context) is called at step 8. DB2ContextControl 226 will use the TransactionContextControl context handle to decide which DB2 context belongs on this thread based upon transactionID. This method must be called first so that it can attach a default DB2 context to the thread for the XADB2ContextControl 226 to use.

If there is a DB2Context for this transaction, that context will be attached to the thread. If there is an active transaction on this thread and it does not yet have a DB2 context associated with it, a default DB2 context will be associated with the transaction and attached to the thread. Then DB2ContextControl 226 will make a special call back to the DatabaseContextCoordinator::initDB2Context (ABCContextHandleListPtr) at step 9. The DatabaseContextCoordinator 222 then calls DB2InitContext (ABCContextHandleListPtr) on the XADB2ContextControl object so that it will finish initializing the context by calling an xa_open on the DBMS, DB2 512 at steps 10 and 11.

DatabaseContextCoordinator 222 will call DB2ContextControl::InitHandleList (ABCContextHandleListPtr) at step 11A. This method will ensure that the context handle list is initialized properly with the correct DB2 context Handle.

If there is no active transaction on this thread 138, a default DB2 context will be attached to the thread. XADB2ContextControl::setAndResumeContext (ABCContextHandleListPtr, Service Context) is called at step 12. XADB2ContextControl 228 does nothing for this case.

Then, DB2ContextControl 226 will call setAndResumeContext (ABCContextHandleListPtr, Service Context) on each ContextControl that is registered with it in the following order. As illustrated at step 13, TransactionsContextControl::setAndResumeContext is called. TransactionsContextControl 224 resumes its context on the thread 138 and places the transactionID of the current transaction in the ContextHandleList for use by the other ContextControls.

At step 14, thread manager 506 calls ORB 504 to continue dispatching method request. At step 15, ORB 504 calls an execute method request on the target object 510. Then the method code runs to completion.

Before the thread 138 is suspended, thread manager 506 calls getAndSuspendContext (ABCContextHandleListPtr) on the ContextCoordinator 204 at step 16. At step 17, DatabaseContextCoordinator::getAndSuspendContext (ABCCont extHandleListPtr) is called. DatabaseContextCoordinator 222 will call DB2ContextControl::InitHandleList (ABccontextHandleListPtr) at step 17A. This method will ensure that the context handle list is initialized properly with the correct DB2 context Handle. Then, DatabaseContextCoordinator 222 will call getAndSuspendContext (ABCContextHandleListPtr) on each ContextControl that has registered with it in the following order.

TransactionsContextControl::getAndSuspendContext is called indicated at step 18 TransactionsContextcontrol 224 suspends its context on the thread 138 and places the transactionID of the current transaction in the ContextHandleList for use by the other ContextControls.

XADB2ContextControl::getAndSuspendContext (ABCContex tHandleListptr) is called indicated at step 19. This must be called with a DB2 context still attached to the thread 138. This will call xa_end(... TMSUSPEND) suspending all databases which are in a state to be suspended indicated at step 20.

DB2ContextControl::getAndsuspendContext (ABCContextH andleListPtr) is called indicated at step 21. DB2ContextControl 228 will detach the DB2 context from the thread 138 and attach a default context to the thread 138, if needed.

If there is an active transactions another method request within this transaction could be made. If so, steps 1 through 21 are repeated until the transaction is ready to end.

When the transaction is ended, Transaction service 516 calls endAssociation(ContextHandleList) on the ContextCoordinator 204 indicated at step 22. ContextCoordinator 204 calls endAssociation (ABCContextHandleListPtr) on the DatabaseContextCoordinator 222 at step 23.

DatabaseContextCoordinator 222 will first call DB2ContexTControl::InitHandleList() at step 23A. This method will ensure that the context handle list is initialized properly with the correct DB2 context Handle. Then, DatabaseContextCoordinator 222 will call endAssociation (ABCContextHandleListptr) on each ContextControl that has registered with it. TransactionsContextControl::endAssociation (ABCContextHandleListPtr) is called indicated at step 24. TransactionsContextControl 224 does nothing. DB2ContextControl::endAssociation (ABCContextHandleListPtr) is called indicated at step 25. DB2ContextControl 226 attaches a DB2 context for the transaction just ending. This context is need by the endAssociation methods of the XADB2ContextControl 228. XADB2ContextControl::endAssociation (ABCContextHandleListPtr) is called indicated at step 26.

XADB2ContextControl 228 call xa_end (.. , TMSUCCESS) on the DBMS 512 indicated at step 27.

XADB2ContextControl 228 calls finishEndAssociation (ABCContextHandleListPtr) on DBMS 512 indicated at step 27A. DB2ContextControl 226 will detach the DB2 context and end the association between the DB2 context on the thread 138 and the transaction, freeing the context to be available for another transaction.

Figure 8A:
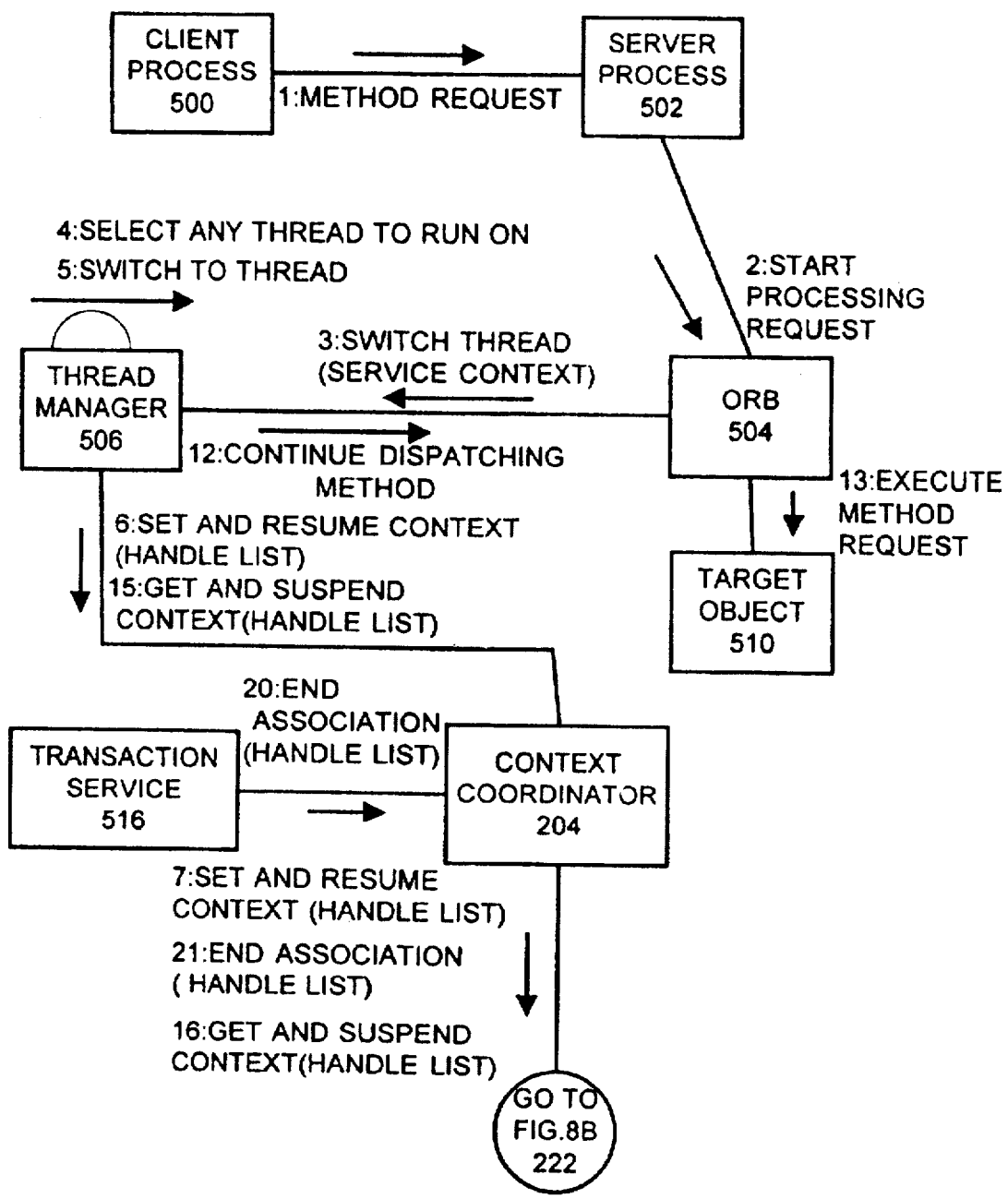
FIGS. 8A, 8B, and 8C together provide a flow chart illustrating exemplary sequential calls when a request to execute a method on an object is received by a server process with XA association transaction migration in accordance with the preferred embodiment.
Figure 8B:
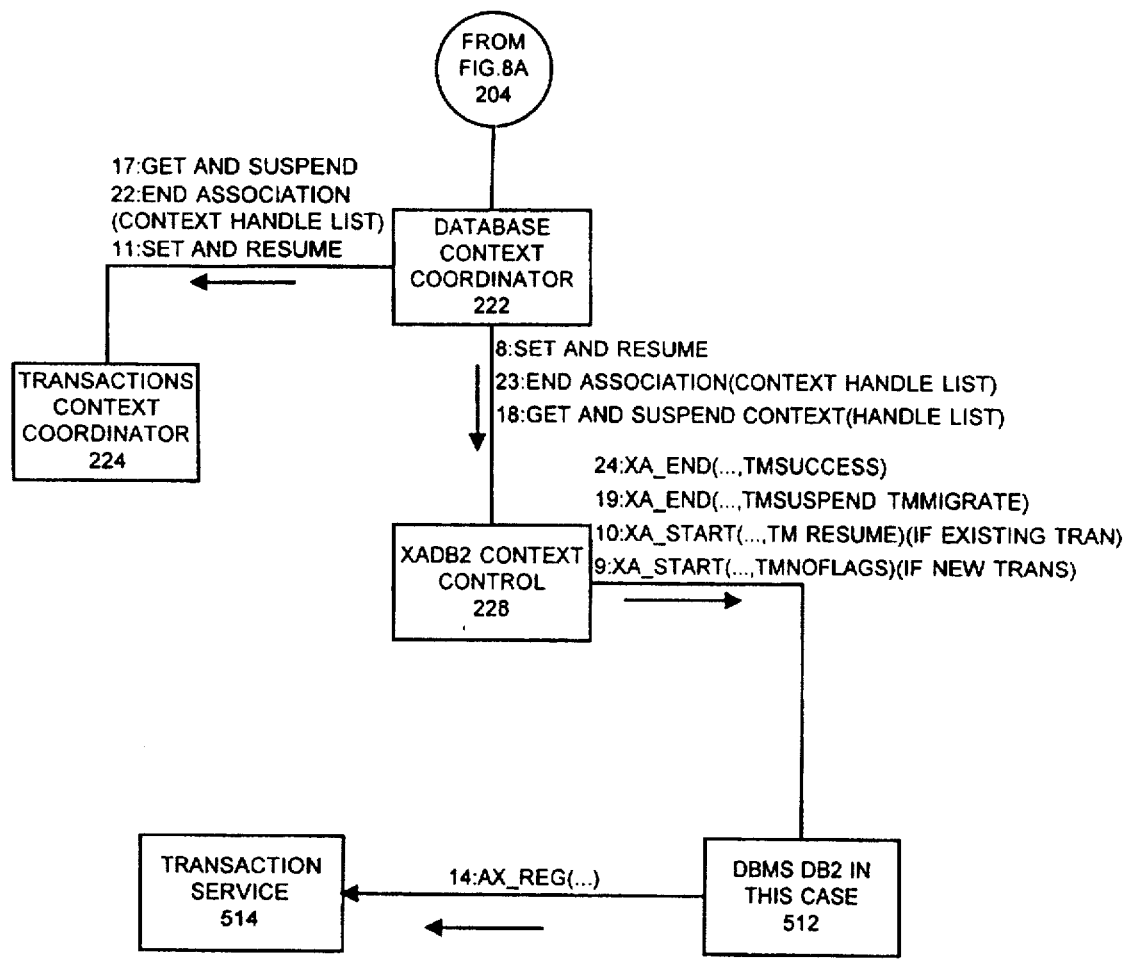
Figure 8C:
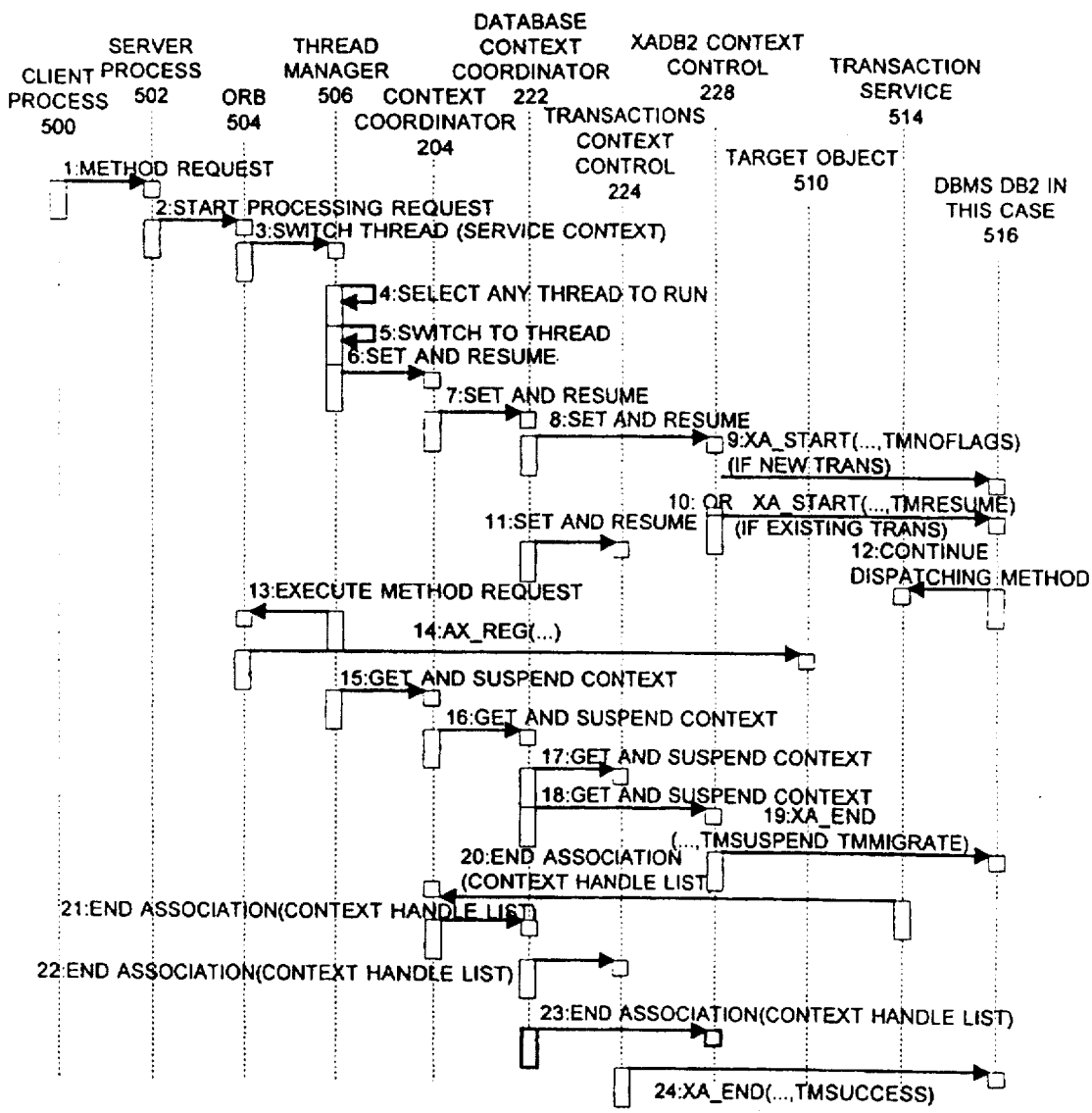

FIGS. 8A, 8B, and 8C together provide a flow chart illustrating exemplary sequential calls when a request to execute a method on an object is received by a server process with XA association transaction migration in accordance with the preferred embodiment. FIGS. 8A, 8B, and 8C cover DBMSs for which at transaction can be moved form one thread to another via XA association migration. These sequential calls are the same for all DBMSs in this category.

In step 1, a request to execute a method is received by a server process 502 from a client process 500 for a transaction that is new to the server. In step 2, the server process 502 calls an object request broker (ORB) 504 to start processing the request. ORB 504 calls switchThreads(Service Context) on the thread manager 506. There is no need to dedicate this transaction to a thread. At steps 4 and 5, a thread is selected for the method to run on and thread manager 506 switches to the selected thread. Any criteria can be used to make the thread selection. Thread manager 506 calls setAndResumeContext (ABCContextHandieListPtr, Service Context) on the ContextCoordinator 204 indicated at step 6.

DatabaseContextCoordinator::setAndResumeContext (ABCContextHandieListPtr, Service Context) is called by the ContextCoordinator 204 indicated at step 7. DatabaseContextCoordinator 222 will forward the setAndResumeContext call to each ContextControl 224, 228 it has registered with it in the following order.

XADB2ContextControl::setAndResumeContext (ABCContextHandieListPtr, Service Context) is called indicated at step 8.

If this is a new transaction and the DBMS uses static registration, XAContextControl::setAndResumeContext (ABCContextHandleListPtr, Service Context) will call xa_start(..., TMNOFLAGS) on the database 516 indicated at step 9.

If this is not a new transaction and the DBMS uses static registration, XAContextControl::setAndResumeContext (ABCContextHandieListPtr, Service Context) will call xa_start(.. , TMRESUME) indicated at step 10 on the database 512.

TransactionsContextControl::setAndResumeContext is called indicated at step 11. TransactionsContextControl 224 resumes its context on the thread 138 and places the transactionID of the current transaction in the ContextHandleList 206 for use by the other ContextControls.

At step 12, thread manager 506 calls ORB 504 to continue dispatching method request. At step 13, ORB 504 calls an execute method request on the target object 510. Then the method code runs to completion.

Before the thread 138 is suspended thread manager 506 calls getAndSuspendContext (ABCContextHandleListPtr) on the ContextCoordinator 204 at step 15. At step 16, ContextCoordinator 204 calls getAndSuspendContext (ABCContextHandleListPtr) on the DatabaseContextCoordinator 222.

TransactionsContextControl::getAndSuspendContext (ABCContextHandleListPtr) is called indicated at step 17. TransactionsContextControl 224 suspends its context on the thread 138 and places the transactionID of the current transaction in the ContextHandleList 206 for use by the other ContextControls.

XADB2ContextControl::getAndsuspendContext (ABCContextHandleListPtr) is called indicated at step 18. XADB2ContextControl 228 will call xa_end(... TMSUSPEND TMMIGRATE) on the database 512 indicated at step 19.

A transaction is ended, the transaction service 514 calls endAssociation (ContextHandleList) on the ContextCoordinator 204 indicated at step 20.

DatabaseContextCoordinator::endAssociation (ABCContextHandleListPtr) is called by the ContextCoordinator 204 indicated at step 21. Then, it will call endAssociation(ABCContextHandleListPtr) on each ContextControl that has registered with it.

TransactionsContextControl::endAssociation(ABCContextHandleListPtr) is called indicated at step 22. TransactionsContextControl 224 does nothing.

XADB2ContextControl::endAssociation (ABCContextHandleListPtr) is called indicated at step 23. XADB2ContextControl 228 calls xa_end(..., TMSUCCESS) on the DBMS 512 indicated at step 24.

Figure 9A:
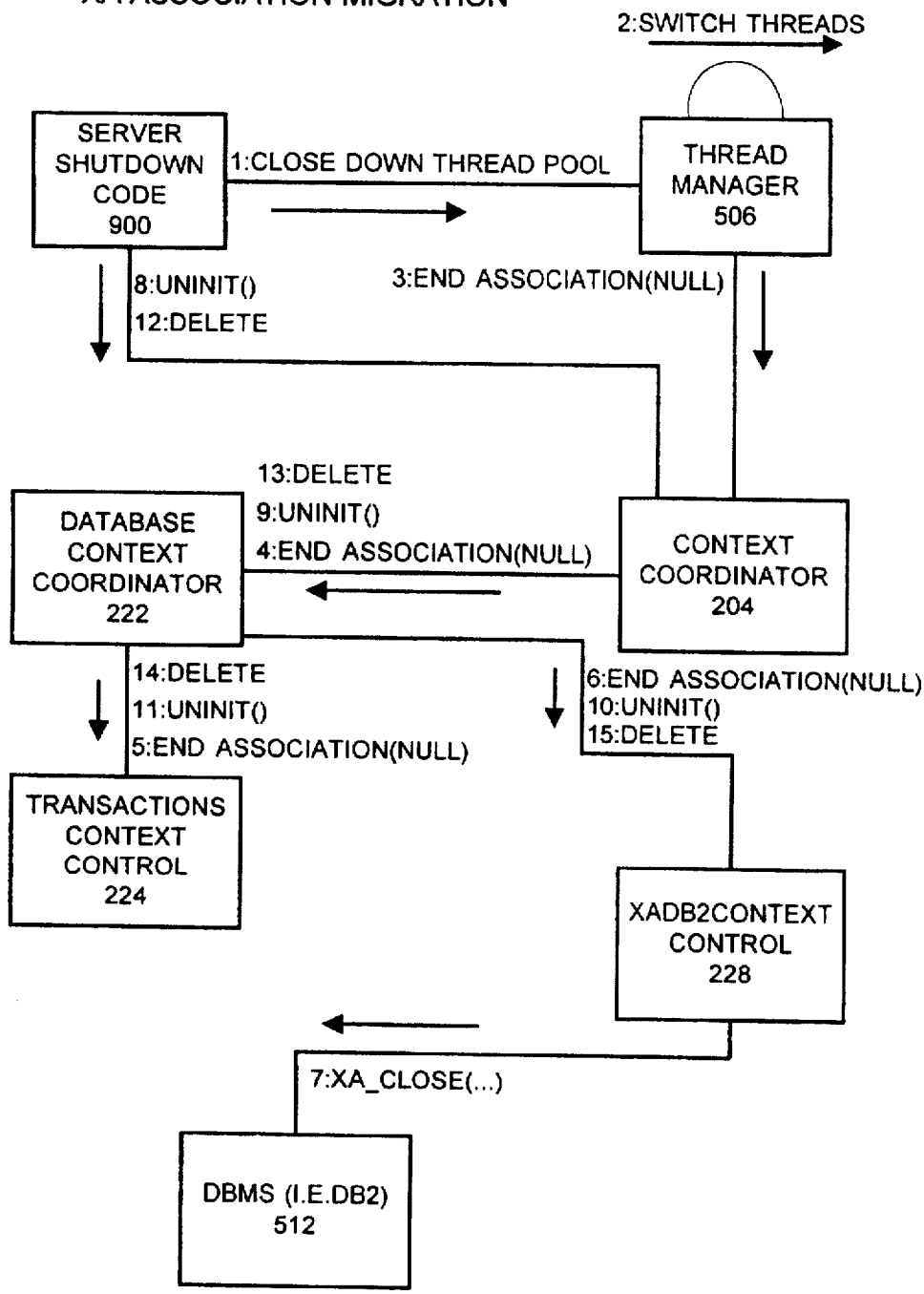
FIGS. 9A and 9B together provide a flow chart illustrating exemplary sequential calls for server shutdown with a specialized ContextCoordinator of FIGS. 3A and 3B for DBMSs for which 1) a transaction cannot move from one thread to another or for which no transaction migration with one transaction active at a time; 2) no transaction migration with multiple transactions active at a time; and 3) a transaction can be moved from one thread to another via XA association migration in accordance with the preferred embodiment.
Figure 9B:
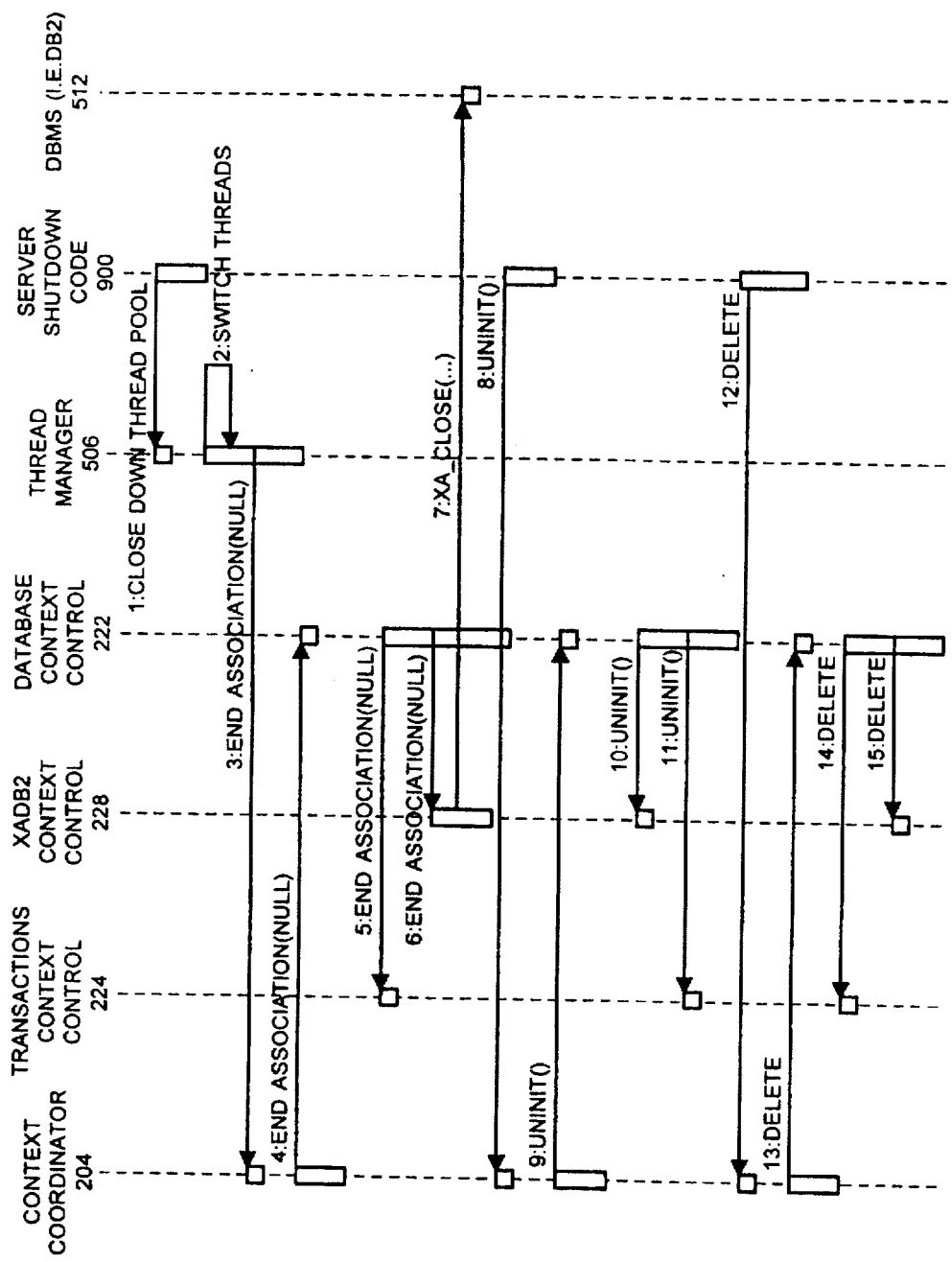

FIGS. 9A and 9B together provide a flow chart illustrating exemplary sequential calls for server shutdown for DBMSs for which 1) a transaction cannot move from one thread to another or for which no transaction migration with one transaction active at a time; 2) no transaction migration with multiple transactions active at a time; and 3) a transaction can be moved from one thread to another via XA association migration in accordance with the preferred embodiment. At step 1, server shutdown code 900 calls the thread manager to close down the thread pool. The thread manager 506 performs a thread switch at step 2. Steps 2 through 7 are repeated for each thread 138 managed by the thread manager 506. The ThreadManager 506 takes each thread out of the wait state and calls endAssociation(NULL). The endAssociation(NULL) indicates that the thread 138 is about to be removed from the server process to give each thread a chance to cleanup. The endAssociation(NULL) call is propagated to all ContextControls. This gives each Context Control a chance to free any resources directly tied to that thread before the thread goes away. At step 7, xa_close is called on the DBMS 512 by the XADB2ContextControl 228.

Next, the top ContextCoordinator 204 will call the DatabaseContextCoordinator::uninit() which passes the call on to each ContextControl at steps 9 through 11. If cleanup/destruction of resources requires either ordering or the existence of other ContextControl objects it should be done here. Order is controlled by the DatabaseContextCoordinator 222.

Next, at steps 12 through 15, the destructors for each ContextControl will run. It is understood that order will not be important at this point.

Figure 10A:
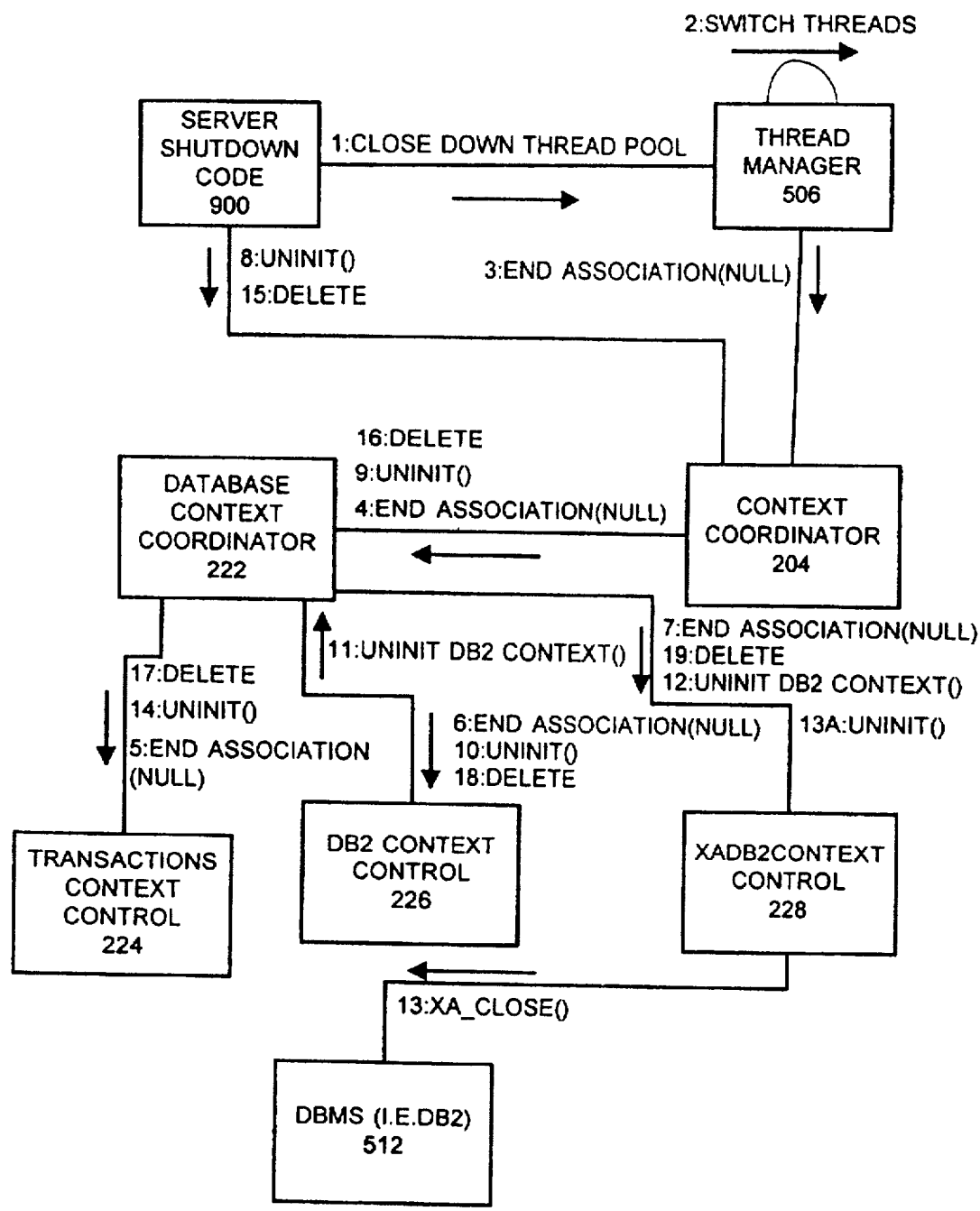
FIGS. 10A and 10B together provide a flow chart illustrating exemplary sequential calls for server shutdown with a specialized ContextCoordinator of FIGS. 4A and 4B with manual transaction migration in accordance with the preferred embodiment.
Figure 10B:
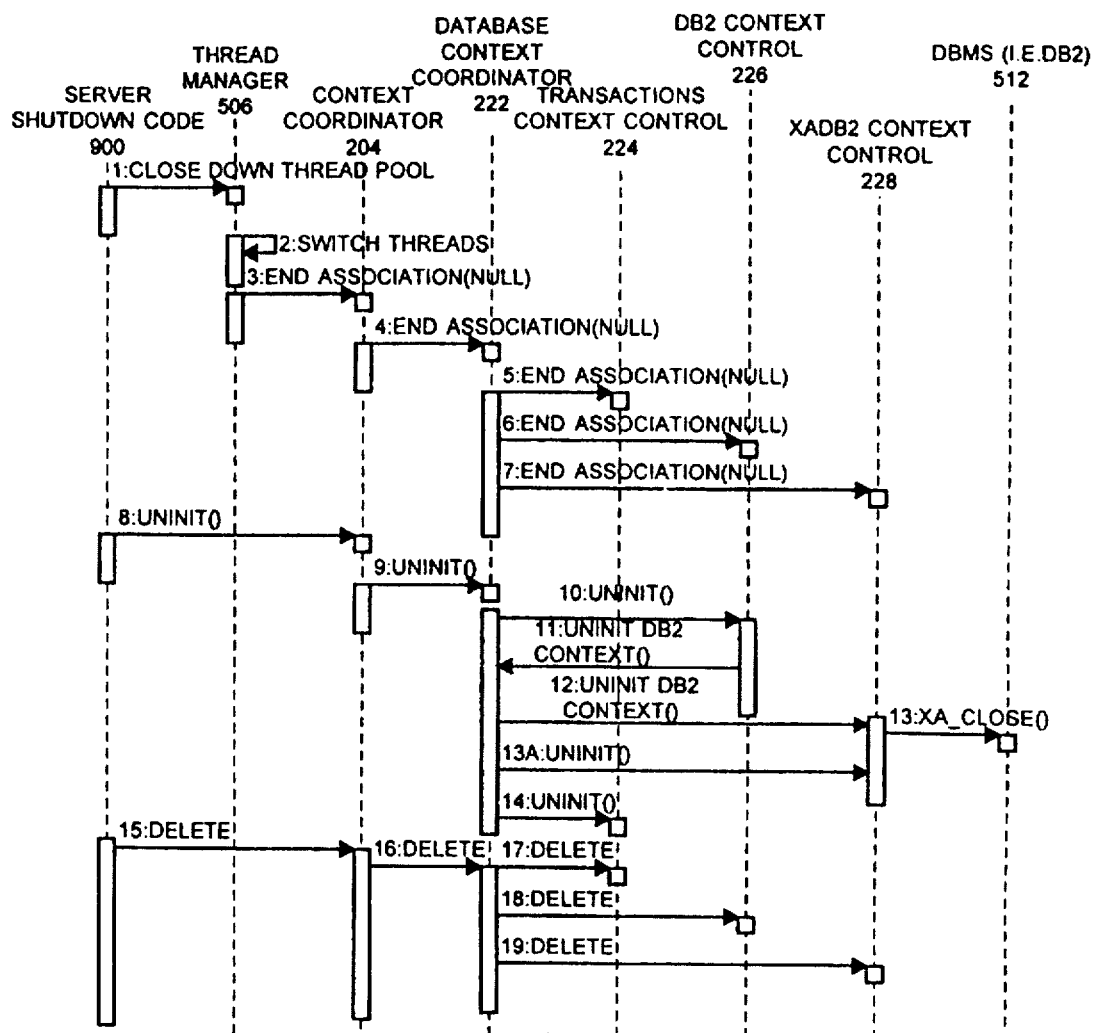

FIGS. 10A and 10B together provide a flow chart illustrating exemplary sequential calls for server shutdown with manual transaction migration in accordance with the preferred embodiment. At step 1, server shutdown code 900 calls the thread manager to close down the thread pool. For all threads 138, the thread manager 506 performs a thread switch at step 2. The thread manager 506 takes each thread out of the wait state and calls endAssociation(NULL). The endAssociation(NULL) indicates that the thread is about to be removed from the server process to give each thread a chance to cleanup. The endAssociation(NULL) call is propagated to all ContextControls indicated at steps 3 through 7. This gives each Context Control a chance to free any resources directly tied to that thread 138 before the thread goes away.

Server shutdown code 900 will call the ContextCoordinator::uninit() indicated at step 8. Next at step 9, the top ContextCoordinator 204 will call the DatabaseContextCoordinator::uninit(), which pass the call on to each ContextControl indicated at steps 10 through 14. If cleanup/destruction of resources requires either ordering or the existence of other ContextControl objects it should be done here. Order will be controlled by the DatabaseContextCoordinator 222.

DB2ContextControl::uninitDB2Context() is called at step 10. XADB2ContextControl 228 will loop through the DB2 contexts that are in use, attaching each one to the thread and then calling. DatabaseContextCoordinator::uninitDB2Context(). DatabaseContextCoordinator 222 in turn calls the XADB2ContextControl::uninitDB2Context() at step 12, which will close any connections open on behalf of the current context by calling xa_close on the DBMS 512 at step 13. At step 13A, the uninit () method is called on the XADB2ContextControl 228. At step 14, the uninit () method is called on the TransactionsContextControl 224. TransactionsContextControl::uninit() does nothing indicated at step 14.

Next, the destructors for each ContextControl will run indicated at steps 15 through 19. It is assumed that order will not be important at this point.

Referring now to FIG. 11, an article of manufacture or a computer program product 1100 of the invention is illustrated. The computer program product 1100 includes a recording medium 1102, such as, a floppy disk, a high capacity read only memory in the form of an optically read compact disk or CD-ROM, a tape, a transmission type media such as a digital or analog communications link, or a similar computer program product. Recording medium 1102 stores program means 1104, 1106, 1108, 1110 on the medium 1102 for carrying out the object oriented thread context management methods for relational databases of the preferred embodiment in the system 100 of FIGS. 1A and 1B.

A sequence of program instructions or a logical assembly of one or more interrelated modules defined by the recorded program means 1104, 1106, 1108, 1110, direct the computer system 100 to provide object oriented thread context management for relational databases of the preferred embodiment.

While the present invention has been described with reference to the details of the embodiments of the invention shown in the drawing, these details are not intended to limit the scope of the invention as claimed in the appended claims.

What is claimed is:

1. An object oriented thread context manager for a computer system including a thread manager for managing multiple threads, said object oriented thread context manager comprising:

a ContextControl class of plurality of ContextControl objects, each said ContextControl object comprising a plurality of methods for associating and disassociating context on a thread for a target object;

a ContextCoordinator class for managing calls to said plurality of ContextControl objects;

a ContextHandleList for storing context information for said ContextControl objects; and a specialized ContextCoordinator for managing calls to specialized ones of said ContextControl objects.

2. An object oriented thread context manager for a computer system as recited in claim 1 wherein said specialized ContextCoordinator comprises a DatabaseContextCoordinator, said specialized ones of said ContextControl objects being registered and unregistered with said ContextCoordinator class and being registered DatabaseContextCoordinator.

3. An object oriented thread context manager for a computer system as recited in claim 2 includes an interface abstract base class (ABC) ContextControl, said ABCContextControl used by said ContextCoordinator class for forwarding calls to said plurality of ContextControl objects, said ABCContextControl used by said DatabaseContextCoordinator for forwarding calls to said specialized ones of said ContextControl objects.

4. An object oriented thread context manager for a computer system as recited in claim 1 wherein said DatabaseContextCoordinator being arranged for coordinating the order of calls to said specialized ones of said ContextControl objects.

5. An object oriented thread context manager for a computer system as recited in claim 1 wherein said specialized ones of said ContextControl objects comprise a TransactionsContextControl class.

6. An object oriented thread context manager for a computer system as recited in claim 5 wherein said specialized ones of said ContextControl objects comprise a DataBaseContextControl class.

7. An object oriented thread context manager for a computer system as recited in claim 5 wherein said specialized ones of said ContextControl objects comprise a XADataBaseContextControl class.

8. A computer-implemented method for object oriented thread context management, said method comprising the steps of:

providing a context manager for managing a plurality of ContextControl objects, each said ContextControl object comprising a plurality of methods for associating and disassociating context on a thread for a target object;

managing calls to said plurality of ContextControl objects utilizing a ContextCoordinator class of said context manager;

storing context information for said ContextControl objects utilizing a ContextHandleList of said context manager; and managing calls to specialized ones of said ContextControl objects utilizing a specialized ContextCoordinator of said context manager.

9. A computer-implemented method for object oriented thread context management as recited in claim 8 further includes the step of managing an ordering of calls to said specialized ones of said ContextControl objects utilizing said specialized ContextCoordinator class.

10. A computer-implemented method for object oriented thread context management as recited in claim 8 further includes the steps of registering and unregistering said specialized ones of said ContextControl objects with said ContextCoordinator class of said context manager.

11. A computer-implemented method for object oriented thread context management as recited in claim 10 further includes the steps of registering said specialized ones of said ContextControl objects with said specialized ContextCoordinator of said context manager.

12. A computer-implemented method for object oriented thread context management as recited in claim 11 further includes the steps of calling an init() method on each said specialized ones of said ContextControl objects said init() method being called on said specialized ones of said ContextControl objects in a predefined order.

13. A computer-implemented method for object oriented thread context management as recited in claim 8 wherein said specialized ContextCoordinator of said context manager comprises at least one DatabaseContextCoordinator and wherein the step of managing calls to specialized ones of said ContextControl objects includes the steps of calling a setAndResumeContext method on selected specialized ones of said ContextControl objects for associating and for reassociating a context with a thread.

14. A computer-implemented method for object oriented thread context management as recited in claim 13 further includes the steps of calling a getAndsuspendContext method on selected specialized ones of said ContextControl objects for disassociating a context from a thread.

15. A computer program product for use in a computer system having a central processor for implementing object oriented thread context management, the computer program product comprising:

a recording medium;

means, recorded on the recording medium, for creating a ContextControl class of plurality of ContextControl objects, each said ContextControl object comprising a plurality of methods for associating and disassociating context on a thread for a target object, means, recorded on the recording medium, for creating a ContextCoordinator class for managing calls to said plurality of ContextControl objects;

means, recorded on the recording medium, for creating a ContextHandleList for storing context information for said ContextControl objects; and means, recorded on the recording medium, for creating a specialized ContextCoordinator for managing calls to specialized ones of said ContextControl objects.

16. A computer program product for use in a computer system having a central processor for implementing object oriented thread context management as recited in claim 15 wherein said specialized ContextCoordinator class comprises a DatabaseContextCoordinator and includes means, recorded on the recording medium, for registering and unregistering said specialized ones of said ContextControl objects with said ContextCoordinator class and means, recorded on the recording medium, for registering said specialized ones of said ContextControl objects with said DatabaseContextCoordinator.

* * * * *

UNITED STATES PATENT AND TRADEMARK OFFICE
CERTIFICATE OF CORRECTION

PATENT NO. : 5,893,912
DATED : Apr. 13, 1999
INVENTOR(S) : Thomas James Freund, Robert Howard High, Jr., Gordon Douglas Hutchison, Martin Mulholland, Charlie James Redlin, Peter John Schommer and Kathryn Sarah Warr It is certified that error appears in the above-identified patent and that said Letters Patent is hereby corrected as shown below:

On the title page, after item [76] insert:

--[73] Assignee: International Business Machines Corporation, Armonk, N.Y.--.

On the title page, after "Assistant Examiner--Diane D. Mizrahi" insert:

--Attorney, Agent, or Firm--Joan Pennington--.

Claim 12, Col. 20, Line 9, "objects" should be --objects;--.

Claim 14, Col. 20, Line 23, "getAndsuspendContext" should be --getAndSuspendContext--.

Claim 15, Col. 20, Line 35, "object," should be --object;--.

Signed and Sealed this

Twenty-seventh Day of July, 1999

Attest:

Q. TODD DICKINSON

*Attesting Officer*   *Acting Commissioner of Patents and Trademarks*